United States Patent [19]

Kikuo et al.

[11] Patent Number: 5,010,774

[45] Date of Patent: Apr. 30, 1991

[54] DISTRIBUTION TYPE TACTILE SENSOR

[75] Inventors: Kanaya Kikuo; Katsuhiko Kanamori, both of Hiratsuka; Ryosuke Masuda, Fujisawa, all of Japan

[73] Assignee: The Yokohama Rubber Co., Ltd., Tokyo, Japan

[21] Appl. No.: 381,710

[22] PCT Filed: Nov. 4, 1988

[86] PCT No.: PCT/JP88/01122

§ 371 Date: Jun. 3, 1989

§ 102(e) Date: Jun. 3, 1989

[30] Foreign Application Priority Data

Nov. 5, 1987 [JP] Japan .................. 62-278348
Jan. 19, 1988 [JP] Japan ...................... 63-7419

[51] Int. Cl.⁵ .......................... G01L 5/00; G01L 1/20; H01C 10/10; B25J 19/02
[52] U.S. Cl. .................. 73/862.04; 73/865.7; 73/172; 338/114; 901/46
[58] Field of Search ................. 73/862.04, 865.7, 172; 128/777; 338/47, 99, 114; 433/68; 341/34; 901/33, 44, 46

[56] References Cited

U.S. PATENT DOCUMENTS

| 4,013,835 | 3/1977 | Eachus et al. ............ 341/34 |
| 4,390,028 | 6/1983 | Okano et al. ............ 128/777 |
| 4,481,815 | 11/1984 | Overton ................. 73/865.7 |
| 4,640,137 | 2/1987 | Trull et al. ............ 73/862.04 |

FOREIGN PATENT DOCUMENTS

| 0066868 | 5/1979 | Japan . |
| 00079126 | 5/1983 | Japan . |
| 0006726 | 1/1986 | Japan ................. 341/34 |
| 0284389 | 12/1986 | Japan . |

Primary Examiner—Charles A. Ruehl
Attorney, Agent, or Firm—Armstrong, Nikaido, Marmelstein, Kubovcik and Murray

[57] ABSTRACT

A distribution type tactile sensor, which comprises a plurality of electrodes provided in pairs at respective pressure sensing points on a pressure sensitive conductive rubber sheet capable of changing the electrical resistance responsive to compressive forces, and a rectifier element provided to respective electrodes for rectifying the current flowing across each pair of electrodes through the rubber sheet, the electrodes being divided into groups each comprising electrodes arranged in a line for respective polarities of the electrodes, electrodes in respective electrode groups being parallel connected to one another through electrode leads, and directions of the division of electrode groups divided for respective polarities being crossed with one another at respective pressure sensing points.

8 Claims, 18 Drawing Sheets

DISTRIBUTION TYPE TACTILE SENSOR

DESCRIPTION

1. Art Field

The present invention relates to a device for detecting contact pressures distributed in a certain breadth of area, using a pressure sensitive conductive rubber capable of changing the electrical resistance in response to compression forces, and displaying the result of detection on a display device in the form of an image or a drawing figure.

2. Background Art

To let a robot or the like handle objects, one practice is to provide a sensor comparable to a tactile organ on the surface of a hand of the robot or the like against which the objects to be handled are contacted so that the objects can be held or gripped with an appropriate degree of force or wherein their configurations can be recognized by the sensor. Conventionally, materials such as semiconductors, ceramics, organic material, optical fibers and so forth are known to be useful for sensor elements. However, the known measurement systems made with use of such materials have problems with their flexibility and/or involve difficulties such that they cannot be made compact, they fail to provide sufficient resolving power for analyzing respective forces, distributed over an area and/or they are not economically feasible. Thus, it is the present status of art that a satisfactory measurement system has not yet been provided.

With the above status of the art in mind, the inventors of the present invention have previously invented a distribution type tactile sensor which makes use, for the sensor element, of a rubber which normally is an insulator but which, when subjected to deformation by an applied force, changes its electrical resistance in response to a change in the amount of the deformation (this rubber will hereinafter be referred to as pressure sensitive conductive rubber). This sensor can determine the forces applied on various contact points of the sensor at which the sensor is contacted with an object. This invention formed the subject matter for a patent application filed in Japan under the patent application No. 60-219245.

The above tactile sensor is of an arrangement in which electrodes are provided in pairs at each measurement point for the measurement of compression forces on a thin sheet-type pressure sensitive conductive rubber, and by which the forces applied at the measurement points are detected as changes in the electrical resistance of the conductive rubber at such measurement points. This tactile sensor may be appllied to an object holding surface of, for example, a robot and utilized as a tactile detecting sensor. Electrodes may be provided in a sufficient number as required for the holding of an object, and the number of electrodes to be provided is, for example, on the order of 16 to 25.

The invention disclosed in the above cited Japanese patent application makes a combined use of a thin layer of a flexible pressure sensitive conductive rubber and electrode leads, and thereby dispenses with the need of providing a sensor at each of the measurement points, thus making it possible to provide a sensor device having a function closely resembling the function of human hands. Thus, the touch or tactile sensor of the invention referred to above can be widely utilized, not only in controlling the force of holding or gripping depending on the strength, the weight, the configuration and so forth of an object to be handled and/or depending on the particular purpose of the handling, but also in distinguishing shapes or configurations of objects and detecting slip or slide, by contacting or touching.

In view of the above, it will be appreciated that by using a sensor device having a number of touch or contact detecting points closely arranged in longitudinal and transverse directions (hereinafter referred to as distribution type tactile sensor), it is possible to display the configuration of the object against which the sensor device is contacted, and the distribution of the contact pressures on the object, in the form of an image or a drawing figure. An attempt made in order to realize this possibility is reported in the Report No. 4016 by Ishikawa et al of Seihin Kagaku Kenkyusho (Industrial Products Research Institute), entitled "Pressure Distribution Sensor Emitting Video Signals", entered in the proceedings of the 28th Japan Joint Automatic Control Congeference under the Society of Instrument and Control Engineers (Nov. 5 to 7, 1986).

The above Report carries a brief disclosure of the technique according to which, now that it is necessary to provide a number of electrodes in order to tell the configuration of an object by means of contact pressures with which the sensor contacts the object, there are provided 4096 electrodes arranged in 64 lines or rows in each of the longitudinal and transverse directions, and an image of the palm of a hand is displayed on a television tube, utilizing circuits detecting electrical resistance of a pressure sensitive conductive rubber on respective electrodes.

DISCLOSURE OF THE INVENTION

An object of the present invention is to provide a sensing circuit in or for a distribution type tactile sensor provided with a number, for example, 4000 or more, of small electrodes for tactile sensing an object. The contact pressures at which the object is contacted by the sensor can be detected to display the configuration of the object in the form of an image or a drawing figure. The sensing circuit of the present invention is in that in comparison to the existing comparable circuits, it can detect tactile signals at respective electrodes at a higher accuracy and a higher speed and can reduce the required number of leads or wires and the consumption of power.

Another object of the invention is to provide an image display system for displaying images and/or drawing figures, using a distribution type tactile sensor made with use of the above sensing circuit.

Yet another object of the invention is to provide various tactile sensing parts having a tactile sensing surface, adapted to particular purposes of detection or measurement.

The distribution type tactile sensor for attaining the above objects according to the present invention makes use of a sensing circuit which is characterized in that electrodes are provided in parts at respective points for measurement of compression forces applied to a pressure sensitive conductive rubber sheet capable of changing the electrical resistance responsive to a change in the compression force, a rectifier element being provided to respective electrodes for rectifying the current flowing across each pair of electrodes through the rubber sheet, the electrodes being divided into groups each comprising electrodes arranged in a line or row for respective polarities of the electrodes, electrodes in respective electrode groups being parallel connected to one another through electrode leads, and directions of the division of electrode groups divided for respective polarities being crossed with each other at respective points for the measurement of compression forces.

According to the invention, it is possible to provide an image or figure display system by processing by a computer the sensed tactile signals outputted from the distribution type tactile sensor made with use of the above sensing circuit, and then by displaying the processed signals on for example a television tube.

Electrodes can be formed by means of attaching onto a surface of a pressure sensitive conductive rubber any of such as rare metal foils, aluminium foils and other metal foils the surface of which is treated for rust prevention, or by laminating on the rubber an insulating film of a synthetic resin having a flexibility and a high strength, for example polyethylene terephthalate, after this film is applied with a printed wiring and its surface is plated with gold or otherwise coated with any of carbon black, graphite and so forth.

The pressure sensitive conductive rubber for use for or in the present invention may be any of known pressure sensitive conductive rubbers comprising conductive particles such as carbon particles dispersed in rubber or an elastomer such as silicone rubber for example. Although this conductive rubber is normally used in the form of a sheet, which may be cut into pieces of the prescribed size, it is also possible to use a rubber in the form of a coating material, which may be applied on electrodes for example by coating and may then be solidified thereon.

The above described distribution type tactile sensor according to the present invention and the image display system made with use of such a tactile sensor can be applied to a variety of uses. For example, a use may be made for measuring the weight applied on the sole of a foot or soles of feet to then operate a diagnosis and/or to determine a guidance for rehabilitation, of a handicapped person. Also, in the carrying out of research work and/or designing activity in the field of human-factors engineering, a use may be possibly made for obtaining data for the designing of sporting shoes and other shoes or the designing of office chairs by investigating the relationship between the manner in which a wearer of shoes walks and the load distribution over various portions of the shoes, or the relationship between the sitting posture of a user of a chair and the distribution of loads over various portions of the chair. A use may also be made in or for industrial robots which automatically classify parts and members respectively having a characteristic shape or configuration.

BRIEF DESCRIPTION OF THE DRAWINGS

FIG. 12 shows switching circuits in the contact sensing circuit;

BEST MODE OF CARRYING OUT THE INVENTION

Now, detailed descriptions will be successively provided of a tactile or touch sensing circuit in or for the distribution type tactile sensors according to the present invention (in what will follow, the sensors will be referred to simply as tactile sensors unless misunderstanding is likely), a picture display system made with use of one of the tactile sensors utilizing the tactile sensing circuit, material structures and methods of use of touch sensors respectively adapted to a particular use, in the mentioned order.

Figure 1:
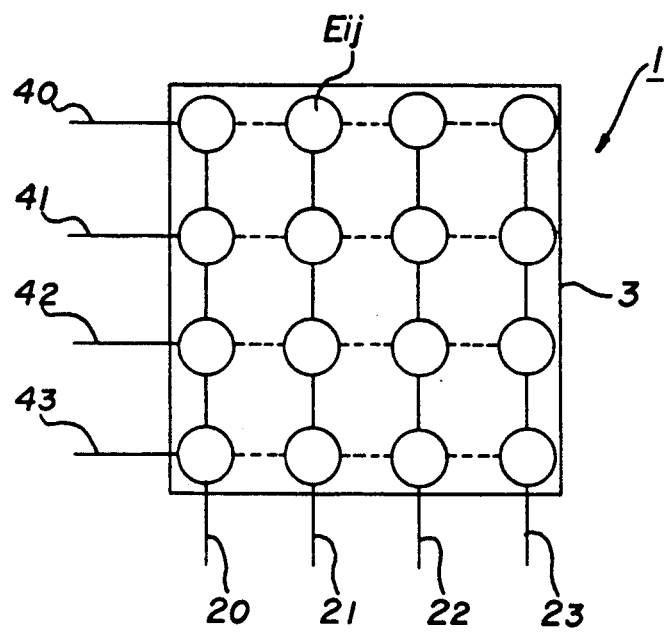
FIG. 1 show a view, taken for illustration of a sensing circuit in a distribution type tactile sensor of the prior art, used in a robot's hand.

FIG. 1 is a view, taken for illustration of circuits used in the electrode part according to the invention disclosed in the before referred-to Japanese patent application No. 60-219245, in which the distribution type tactile sensor (touch sensor) indicated at 1, which is provided in a robot's hand (not shown) comprises 16 electrodes $E_{ij}$ (i, j=0~4). Four electrodes on the output side (hereinafter shown by Eo) are attached to each of four parallel arranged output electrode leads $2_0$ to $2_3$ and disposed on a front surface of a sheet-type pressure sensitive conductive rubber 3, and on the other, backside surface of the rubber 3, four feed electrode leads $4_0$ to $4_3$ having feed-side electrodes Ep (not shown) attached thereto at the points corresponding to the locations of the electrodes Eo are so disposed as to cross the electrode leads $2_0$ to $2_3$.

When a robot's hand having the above tactile sensor 1 is contacted against an object to be held by the robot's hand, a contact pressure is applied to the pressure sensitive conductive rubber 3 and its electrical resistance undergoes a lowering, corresponding to which a current flow takes place through electrodes $E_{ij}$. Therefore, for example by connecting the electrode lead $4_0$ to a power source and by taking the current successively from each of the electrode leads $2_0$ to $2_3$, it is possible to detect the contact pressure at each of the locations at which the 16 electrodes $E_{ij}$ are provided. Accordingly, it is possible to control to a certain value the forces applied at various portions of the object being gripped or otherwise held by the robot's hand, so that the robot's hand can safely hold various objects which cannot stand a strong force application, such as eggs for example.

For the sensing of forces for purposes like that described above, generally it is not required to provide a very large number of sensing points, but if such sensing is for the purpose of detecting a shape or configuration of an object by a tactile sensor, as in the before cited technical Report by Ishikawa et al, it is necessary to considerably increase the number of the sensing points.

Now, with reference to FIGS. 2 and 3, a brief explanation will be given the distribution type tactile sensor according to the prior art made public by the above referred-to technical Report by Ishikawa et al.

Figure 2:
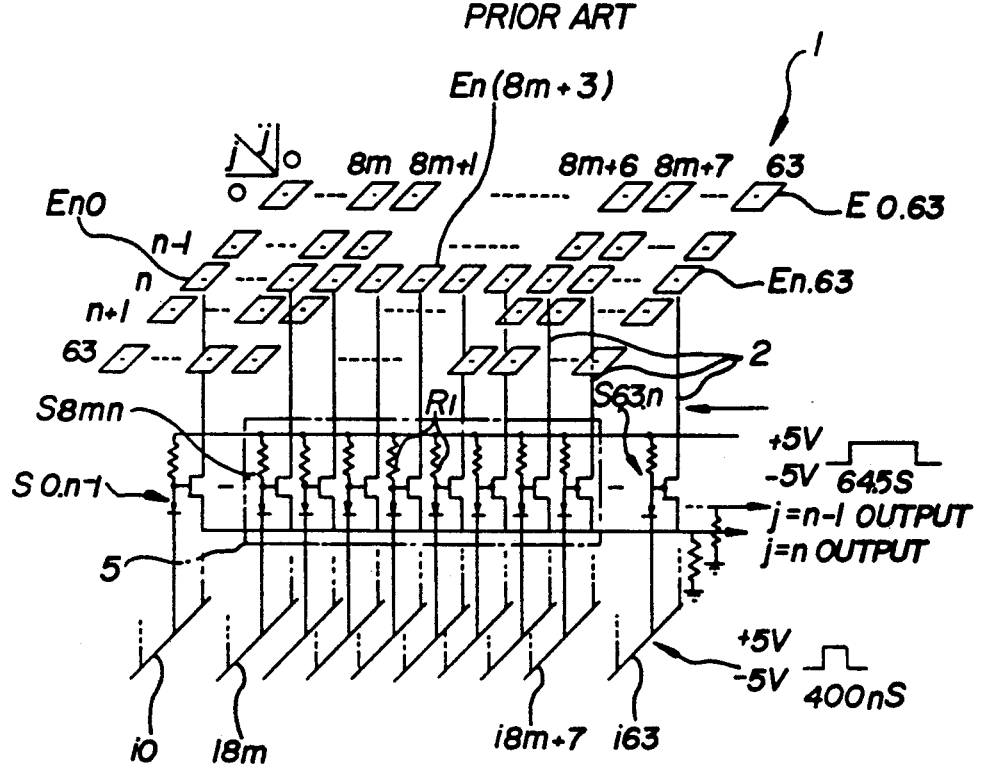
FIG. 2 is a view, taken for a brief illustration of a sensing circuit of a distribution type tactile sensor in the prior art, used in an image display system.

In FIG. 2, the distribution type tactile sensor 1 comprises pairs of electrodes $E_{ij}$ (i=0...8m~8m+7...63, j=0...n−1, n, n+1...63; 4096 electrodes in total), which are disposed on a backside of a pressure sensitive conductive rubber (not shown) and to which respective switches $S_{ij}$ comprising FET, a resistance and a diode (i=0...8m~8m+7...63; j=0...n−1, n, n+1...63; 4096 switches in total) are connected by electrode leads 2.

Figure 3:
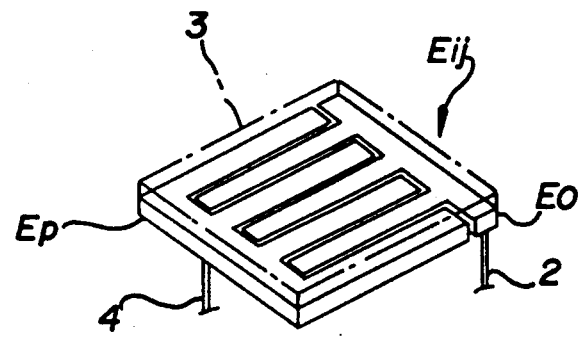
FIG. 3 shows a perspective view of electrodes used in the circuit of FIG. 1.

As shown in FIG. 3, the electrodes $E_{ij}$ comprise a square electrode having a side length of about 5 mm, in which an electrode Ep and an electrode Eo shaped in the form of comb teeth are assembled in a meshing arrangement having a prescribed space therebetween. Electrodes Ep on the one hand and electrodes Eo on the other hand make up electrodes for connection to a power source side and electrodes for connection to an output side, respectively. Further, on (the load bearing side of) the electrodes $E_{ij}$, the pressure sensitive conductive rubber 3 is placed. Although this rubber 3 is shown in FIG. 3 to be of a same size as the electrode, usually the rubber 3 is in the form of a sheet, on which all the electrodes $E_{ij}$ are attached.

In the tactile sensor 1, it is necessary to mount 4000 or more switches, as stated above, on a square sensor board having a side length of about 32 cm, and to arrange electrode leads 4 for connecting all electrodes Ep to a power source above the switches. Accordingly, a problem is posed that the wiring cannot be performed with high efficiency. In view of this, and in order to miniaturize switches and build them in the touch sensor 1 so as to facilitate the wiring operation and also to reduce the overall size of the device, in the case of the prior art example illustrated in FIG. 1, it has been proposed that switching circuits made with use of FET's for the switching elements are collectively formed on a single switch board to provide a hybrid IC of 1×8 cells and of a pin pitch of 1.26 mm, which is disposed on a backside of the touch sensor 1.

However, in the case of the sensing circuits of FIG. 2, it is necessary to arrange 4096 electrode leads 2 for connecting together a sensor board provided with all electrodes $E_{ij}$ and a switch board provided with all switches $S_{ij}$ at a spacing of about 5 mm and, in addition, connect electrode leads 4 above the electrode leads 2 (FIG. 2). In this case, according to the above described prior art, a problem is met in that the wiring operation and the assembling of the device can only be performed at an extremely low operation efficiency.

In addition, according to the above described prior art, the switch board has to be arranged on the backside of the tactile sensor 1 in a condition in which a great number of electrode leads 2 project therefrom, so that no means is made available for supporting the touch sensor 1 on the backside thereof. A further problem is posed in that in order to effect a reinforcement, it is indispensable that the sensor board itself to be very stiff, whereby it becomes difficult to reduce the thickness and the weight of the device.

It may possibly be made to apply the circuit of FIG. 1 to the sensing circuit of the prior art shown in FIG. 2 to effectively reduce the number of the output leads for the respective electrodes. It is provided, however, that unless a compensating circuit is provided, the circuit of FIG. 1 cannot operate to display the shape or configuration of an object as described below. The reasons for this will be described with reference to FIGS. 4 and 5. Further, FIG. 5 shows an equivalent circuit diagram, in which respective resistances R show equivalent resistances with the current flowing in a minimum flow path in the pressure sensitive conductive rubber.

Figure 4:
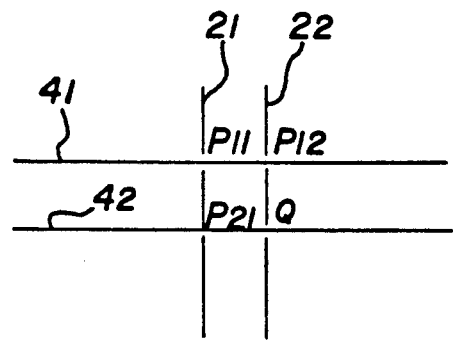
FIG. 4 is a circuit diagram, taken for illustration of a problem with the circuit of FIG. 1.
Figure 5:
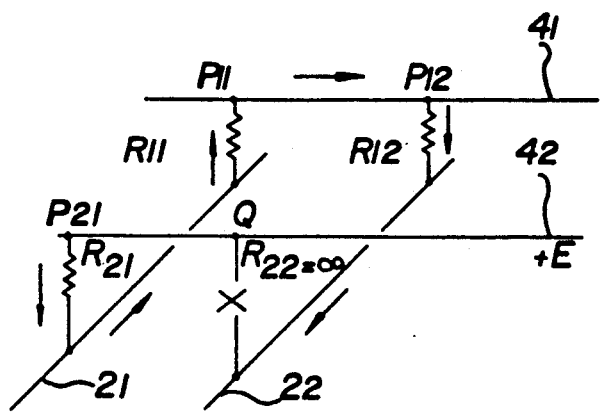
FIG. 5 is a view, taken for illustration of the reason for the generation of a stray current in the circuit of FIG. 4.

For avoiding complexity in the description, in FIGS. 4 and 5 electrode leads are shown to simply comprise the electrode leads $4_1$ and $4_2$ of FIG. 1 on the pressure bearing side and the electrode leads $2_1$ and $2_2$ of FIG. 1 on the backside, and the sensing points, namely the intersections of the leads, are shown to simply comprise $P_{11}$, $P_{12}$, $P_{21}$ and Q. For purposes of explanation, it may be tentatively supposed that while respective points P are in contact with an object and are exerting a contact pressure, the point Q is not in contact with the object and that the electrical resistance at the point Q is to be determined.

Electrical resistances between intersections of electrode leads 2 and 4 are shown by $R_{11}$, $R_{12}$, $R_{21}$ and $R_{22} = \infty$ ($\infty$ denotes that the electrical resistance of the rubber corresponds to that of an insulator). Now, as shown in FIG. 5, a voltage E may be impressed across electrode leads $2_2$ and $4_2$, wherein, although no current flow actually takes place across the resistance $R_{22}$, a stray current I $[=E/(R_{21}+R_{11}+R_{12})]$ flows through a stray current circuit from the resistance $R_{21}$ to the resistance $R_{11}$ and further to the resistance $R_{12}$ ($R_{21} \rightarrow R_{11} \rightarrow R_{12}$), whereby it is erroneously determined that a force is applied at the point Q.

Actual tactile sensors have a number of sensing points, for example 8×8 or more, and it is a problem with them that due to the stray current, it is impossible to detect accurate electrical resistance values.

As a consequence, conventional tactile or touch sensors may exhibit a satisfactory function wherein a relatively large space can be provided between sensing points or wherein the required conditions for the sensing is relatively not severe, but they cannot provide a tactile sensor having a relatively high power of resolution or analysis and an accordingly high operation efficiency.

Figure 6:
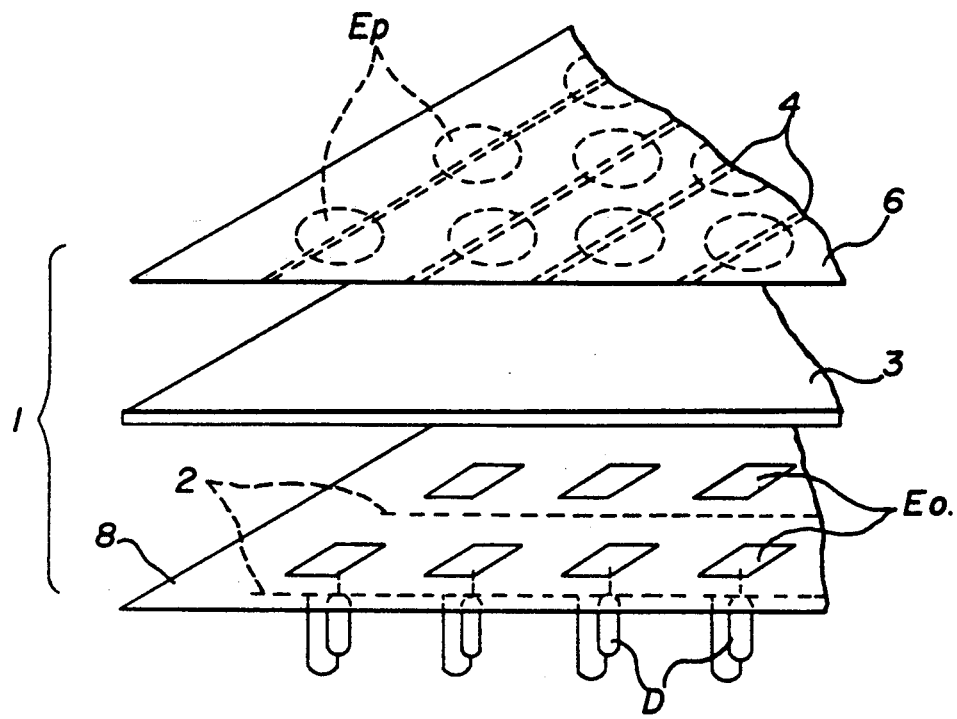
FIG. 6 is a perspective partial view, showing the structure of a sensing part in a distribution type tactile sensor according to an embodiment of the present invention, shown in a disassembled condition.
Figure 7:
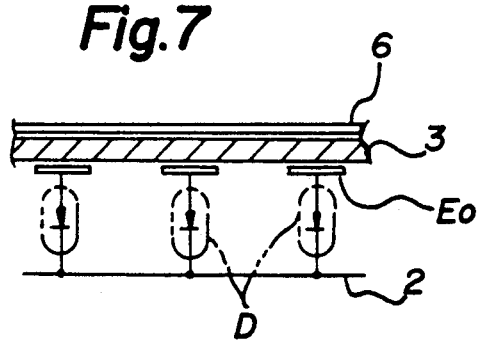
FIG. 7 shows a vertical sectional view through FIG. 6.

Now, with reference to FIGS. 6 and 7, a description will be provided of the arrangement of the sensing part in the distribution type tactile sensors according to the present invention.

FIG. 6 is a partial perspective view, showing essential portions of an 8×8 matrix distribution type tactile sensor according to the present invention, in a disassembled condition. As shown, on the pressure bearing side of the pressure sensitive conductive rubber 3, there is superposed a printed circuit plate 6 having a printed wiring of electrode leads 4 and feed-side electrodes Ep. Electrode leads 4 are shown by broken lines to show that they are printed on the side of the plate 6 facing the pressure sensitive conductive rubber 3. Electrodes forming parts of the electrode leads 4 are provided with the electrodes Ep coated with a conductive coating material such as carbon black and graphite, and the surface of the plate 6 is made rust preventive.

On the other, or the backside, surface of the pressure sensitive conductive rubber 3, a printed circuit plate 8 is disposed, which is printed, on a front-side surface, with output-side electrodes Eo in an 8×8 matrix arrangement and, on the backside, with electrode leads 2. The electrode leads 2 and 4 are arranged to cross one another (in the illustrated embodiment, they cross at right angles). Electrodes Eo and leads 2 are connected together by diodes D.

FIG. 7 illustrates in section details of the wiring and connection together of the diodes D and the electrodes Eo. As stated above, in actuality the electrodes Eo and the diodes D are provided on a front-side and a backside surfaces of the printed circuit plate 8.

As can be seen from the foregoing description, there are 8×8 sensing points in the sensing part of the tactile sensor according to the present invention, and these sensing points are divided into 8 groups, polarity by polarity. On each of the 8 electrode leads 2, 8 electrodes Eo are connected in a linear arrangement, and lines of electrodes Eo are parallel arranged. Similarly, 8 electrodes Ep are connected in a linear arrangement on each of the 8 electrode leads 4, and lines of electrodes Ep are parallel arranged.

The tactile sensor 1 according to FIGS. 6 and 7 does not produce the stray current described above in relation to FIG. 5, and can therefore exhibit a drastically improved sensing accuracy. This will be now described with reference, for comparison FIG. 8, which corresponds to purposes, with prior art FIG. 5.

Figure 8:
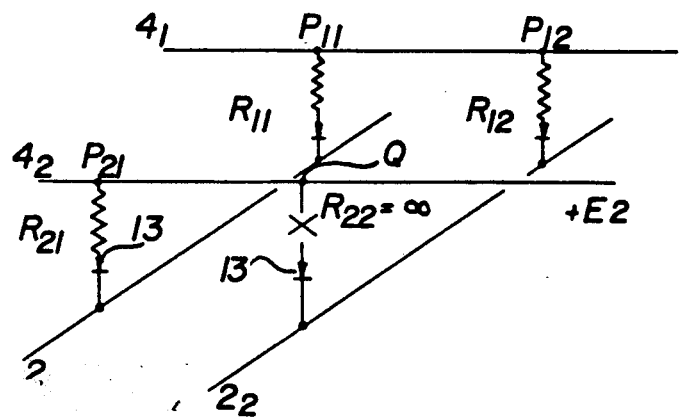
FIG. 8 is a view, taken for illustration of the reason for why the stray current is not generated in the sensing part shown in FIG. 6.

As can be seen from a comparison between FIG. 5 and FIG. 8, a diode D in the tactile sensor 1 in FIG. 8 can prevent the stray current tending to flow through $R_{11}$, so that in this tactile sensor 1, a stray current circuit of $R_{21} \rightarrow R_{11} \rightarrow R_{12}$ is not formed. Therefore, for example where a contact force is applied at each of $R_{11}$, $R_{12}$ and $R_{21}$ but not at $R_{22}$, a voltage may be applied to the electrode lead $4_2$ and current may be taken from the electrode lead $2_2$, however, no output current will be produced as opposed to the before considered case of the prior art. That is to say, using the circuit shown in FIGS. 6 and 7, it is possible to accurately detect the current flowing across the electrodes Eij at the intersections of electrode leads 4 connected to a power source and the electrode leads 2 for taking out the current.

Figure 9:
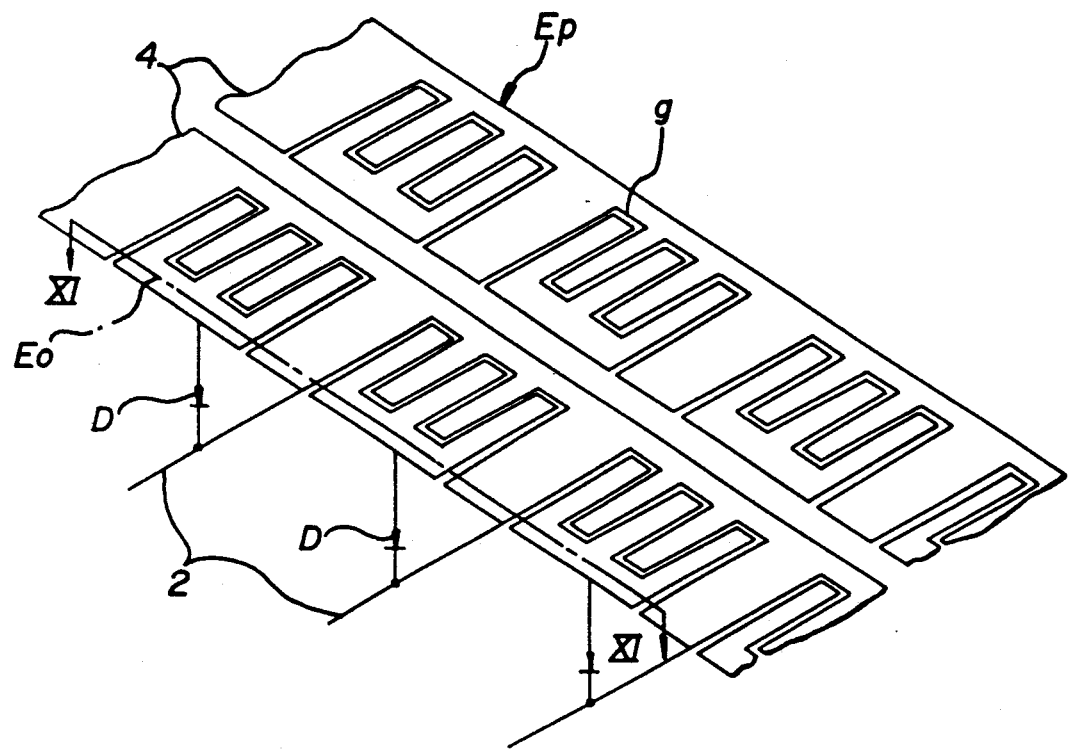
FIG. 9 shows a view, taken for illustration of electrodes in a distribution type tactile sensor according to another embodiment of the present invention.
Figure 10:
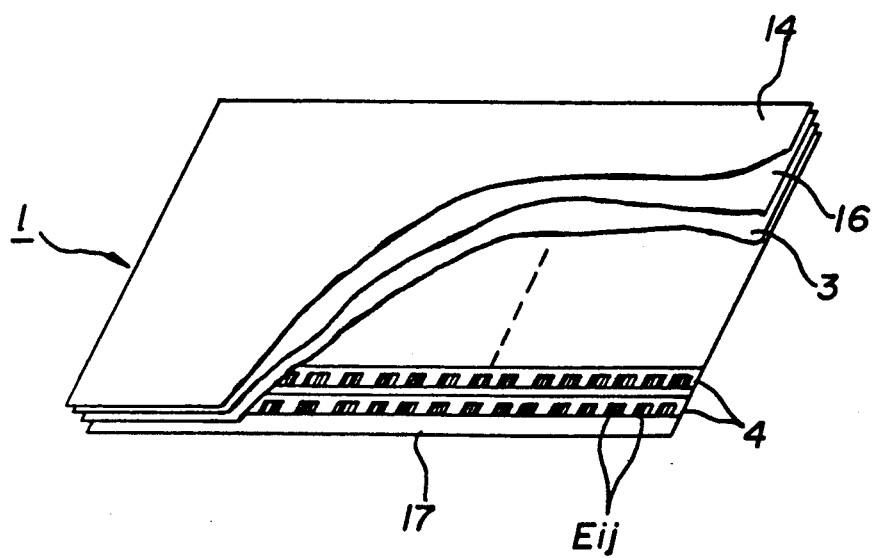
FIG. 10 is a partly broken-away perspective view, showing the distribution type tactile sensor incorporating the electrodes shown in FIG. 9.
Figure 11:
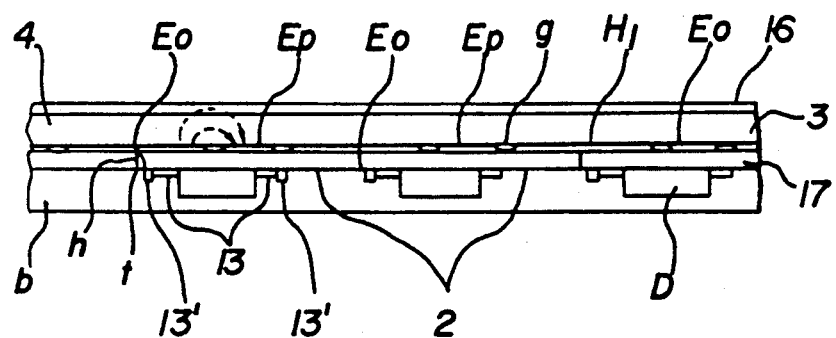
FIG. 11 shows a sectional view taken on the line XI—XI in FIG. 9.

FIG. 9 shows a perspective view of electrodes used in another embodiment of the tactile sensor according to the present invention, FIG. 10 being a perspective view of a tactile sensor incorporating the electrodes shown in FIG. 9, and FIG. 11 being a sectional view, taken on the line XI—XI in FIG. 9.

Similar to the electrodes shown in FIG. 3 (prior art), the electrodes shown in FIG. 9 comprise square combtooth shaped electrodes, which are provided on just one of the two surfaces of a pressure sensitive conductive rubber.

Electrodes Eo and Ep, and electrode leads 2 and 4, are printed on a printed circuit plate shown at 17 in FIGS. 10 and 11, and the electrode parts are formed by plating with gold. Electrodes Eo and electrodes Ep, each of which takes a comb-like shape, are assembled in a meshing arrangement with the prescribed gaps g maintained as shown. Electrodes Ep and leads 4 are integrally formed.

Electrodes Ep are connected to leads 2 printed on the other side surface of the printed circuit plate 6 through diodes D which form rectifier elements according to the present invention. As best seen from FIG. 11, taps t applied in thorugh-holes h formed in the printed circuit plate 6 and electrode leads 2 are connected to pins 13 of commercially obtained diodes D of a flat-plate type by soldering 13'. Further, the electrode leads 2 extend at right angles to the plane of the drawing sheet of FIG. 11. Also in FIG. 11, the reference symbol b denotes a backing-up sheet of, for example, polyurethane, which is applied to provide a flat surface, compensating for irregularities formed by diodes on the backside of the contact sensor 1.

Then, as best seen from FIG. 10, on the electrodes Eo and Ep, a sheet-type pressure sensitive conductive rubber 3 is placed, on which superposed is a touch or contact member (surface forming member) 14 which may be referred to as a skin. This surface forming member 14 comprises a sheet formed by laminating on a fabric a soft foamed sheet capable of closely contacting an object to be handled, and under this surface forming member 14, an upper-side conductive film 16 is further disposed. The electrodes Eij (pairs of Eo and Ep) are provided, wherein a number of 4096 electrodes is provided within an area of about 32 cm×32 cm in a square net-work or a chessboard arrangement.

Figure 13:
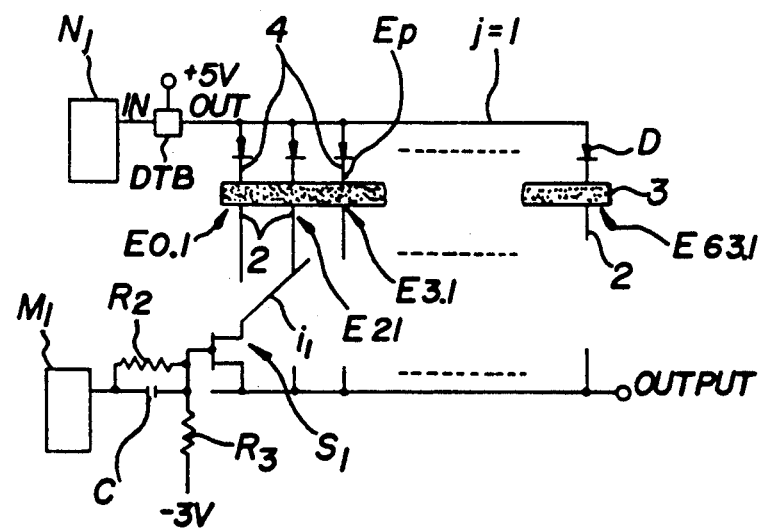
FIG. 13 shows a sectional view of essential portions of the switching circuits of FIG. 12.

Now, referring to FIGS. 12 and 13, a description will be provided of the output circuits for outputting the data on touch or contact from the above described tactile sensing circuits.

FIG. 12 shows output circuits in or of a touch sensing system, which were made with use of CMOS-IC for the output switches and which are applicable to the tacticle sensor shown in FIGS. 6 and 7 and the tactile sensor shown in FIGS. 9, 10 and 11. Further, FIGS. 12 and 13 illustrate the instance in which 64 electrodes Eij are used in each of the vertical and transverse directions (4096 electrodes in total).

For the multiplexor shown at 18, for operating 64 output switches Si comprising FETS shown in FIGS. 12 and 13, use was made of a high signal output CMOS-IC, type 74HC238 (a surface mounting device, a product of NEC Corporation; this same description is applicable also to the below appearing CMOS-IC's.) as $M_1$ to $M_8$, and for the multiplexor shown by 20 for operating feed-side switches Sj, use was made as $N_1$ to $N_8$ of a low siganl output CMOS-IC's, type 74HC 138. In each of the CMOS-IC's, the elements comprise a 3-to-8 decoder, decoding one of 8 output lines under the condition of 3 selection inputs and 3 enabling inputs.

Thus, in order to operate 64 switches Si and 64 switches Sj, it is necessary to use 8 each of 74HC138 and 74HC 238. Therefore, for decoders for controlling 8 IC's, 74HC138, $M_9$ and $M_{10}$, were used for the multiplexors 20 and 18, respectively. Further, for the feed switches Sj for the illustrated embodiment, widely used digital transistors (DTB) were used.

In the circuit Ci for operating the output switches Si in the touch sensor 1, the No. i output pin of the 64 pins in the multiplexor 18 and the gate of FET of the switch Si were connected together by a capacitor C, and as shown in FIGS. 12 and 13, a bias voltage of $-3$ V was impressed through a voltage divider circuit comprising resistances $R_2$ and $R_3$.

For the operation of the switch Si, it is sufficient only if a voltage capacity enough to produce a switching level for the FET is provided therefore, the voltage ($-3$ V) to be impressed to the gate of FET was obtained from a 5-V power source for operating the tactile sensor 1. That is to say, by a voltage of 5 V supplied from the 24th and 25th pins of output terminals of a control device (not shown), an RC oscillation circuit was excited, and the negative voltage of the alternating voltage thus obtained was supplied through a constant-voltage circuit 22 for obtaining $-3$ V, composed of a transistor and a constant-voltage diode.

One of the characteristics of the sensing circuit of the present embodiment resides in that all of the required power, including the bias voltage of $-3$ V for operating the gate of FET, can be supplied by a single power source as described above.

The above described embodiment operates as follows. From the 11th to 16th pins and the 19th pin (for enabling input) of the terminal 22 of the control device, address signals for operating feed switches Sj are sent to the feed multiplexor 20 for the electrodes Eij. Also, from the 1st to 6th pins and the 9th pin (for enabling input), address signals for operating output switches Si are sent to the output multiplexor 18. The respective signals are modified to operation signals through receiver circuits 24 and 26 and then transmitted to A to C pins of respective decoders $M_1$ to $M_8$ and $N_1$ to $N_8$, and signals for operating the decoders $M_1$ to $M_8$ and $N_1$ to $N_8$ are imparted to A to C pins of the decoders $M_9$ and $M_{10}$.

Decoders $M_9$ and $M_{10}$ issue signals for operating one of decoders $M_1$ to $M_9$ and $N_1$ to $N_9$, successively. To these decoders $M_1$ to $M_9$ and $N_1$ to $N_9$, and from the decoder $M_1 \ldots$ or $M_8$ or the decoder $N_1 \ldots$ or $N_8$ that is put into operation by the above signals, high signals are outputted for opening switches Sj and Si to be successively operated, whereby a voltage is impressed successively to the electrodes Eij, whereupon the current corresponding to the degree of compression force is taken out from the output terminal 28.

The output switches Si according to the present invention may comprise the switching circuits Sij shown in FIG. 2, in place of the driving or operating circuit shown in FIG. 12. In the following, a description will be entered into the characteristics of the switching circuit Si shown in FIG. 12, in comparison to the conventional switching circuit Sij.

When an FET is used for the output switch element, the switching operation of gates in the case of FIG. 2 relies upon the H of the open collector of TTL, and it is further necessary to lower the impedance of the gates, so that it is required to effect a pulling up by the resistance $R_1$ (for example, 1 k$\Omega$). In this case, the length of time for outputting high signals because opening a gate is 1/64 of a total length of time (for there are 64 electrode leads i), and the output is L for the remaining 63/64 length of time, whereby a power of, for example, on the order of 10 mA flows to the resistance of 1 k$\Omega$. A same situation as the above applies to the remaining 63 electrode leads, and as a whole, a power of 640 mA will flow in total, whereby a considerable heat generation takes place.

In contrast to the above, in the output switching circuit Si shown in FIG. 12, it is possible to lower the required operation current to the order of $\mu$ amperes. Therefore, it is possible to considerably suppress the current capacity as a whole, reduce the feed power capacity, and suppress the heat generation, so that it is possible to miniaturize the sensor circuit.

Further, using the sensor circuit of FIG. 12, as before indicated, the current capacity required for switching operation of the FETS can be extremely small, so that the bias voltage ($-3$ V) to be imparted to the gate of the FETS can be taken from the 5-V feed voltage for the sensor circuit. The switching circuits used in the prior art (for example the one shown in FIG. 2) require two power sources, a $+5$ V power source and a $-5$ V power source. As opposed to this, the circuit of FIG. 12 is characterized further in that it can lower the power consumption and simplify the circuit only with the need of a single power source, so that it becomes possible to provide a compact device.

Advantages brought about because of the sensor circuit of the above described embodiment may be summarized as follows. The 4096 output switches required in the prior art could be reduced only to 64; the sensor circuit could be operated only with a 5V-power source alone; therefore, the required number of parts could be reduced and it became possible to simplify the circuit; the current value flowing through the output switching circuits could be reduced; and a tactile sensing part and sensor circuits could be mounted on a single sensor board, whereby it was possible to effect a reduction in size and weight and an increase in strength of the device.

As can be perceived from the foregoing description, in the tactile sensor 1 according to the present embodiment, 64 electrodes Eo and 64 electrodes Ep are parallel connected on each of 64 leads 2 and 64 leads 4 respectively. According to this arrangement, it is possible to reduce the 4096 high-speed switching elements required in the prior art to only 128, whereby it is possible to lower the production cost and simplify the arrangement of circuits around the sensing part.

Image Display System

Figure 14:
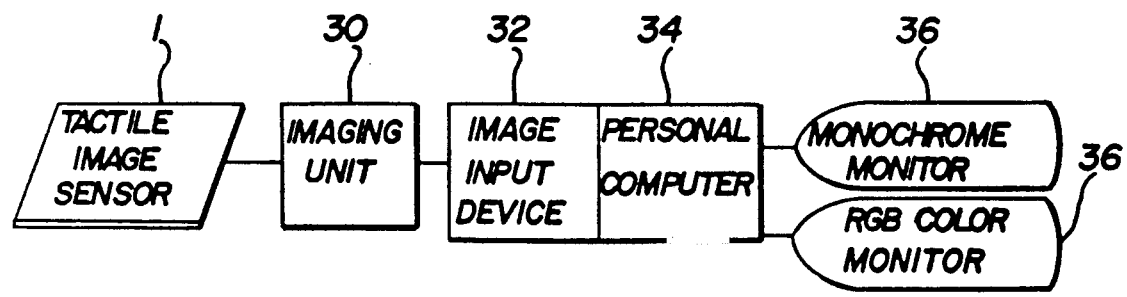
FIG. 14 is a block diagram of a picture display system.
Figure 12A:
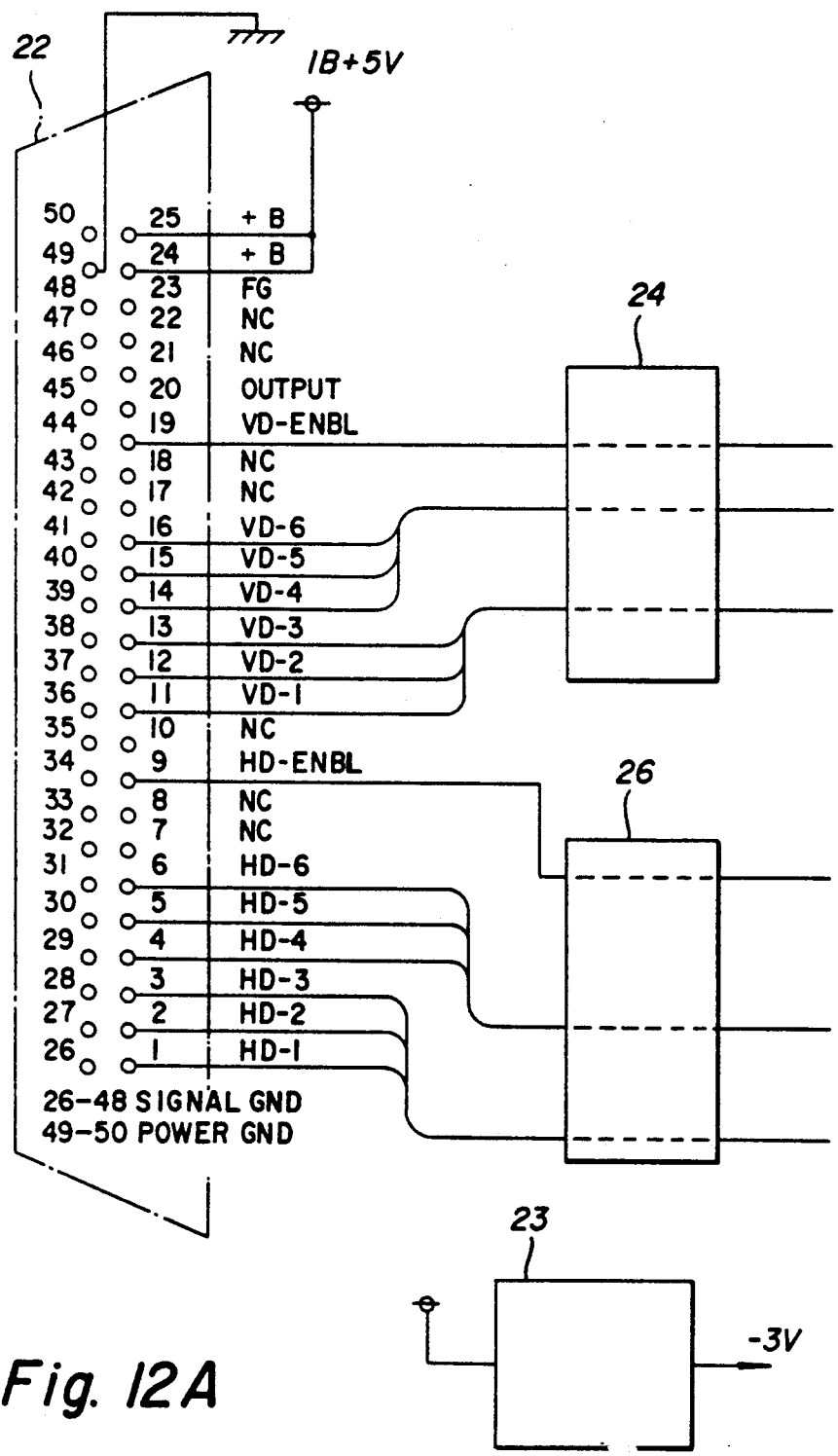
FIGS 12A-12C show separate parts of FIG. 12.
Figure 12B:
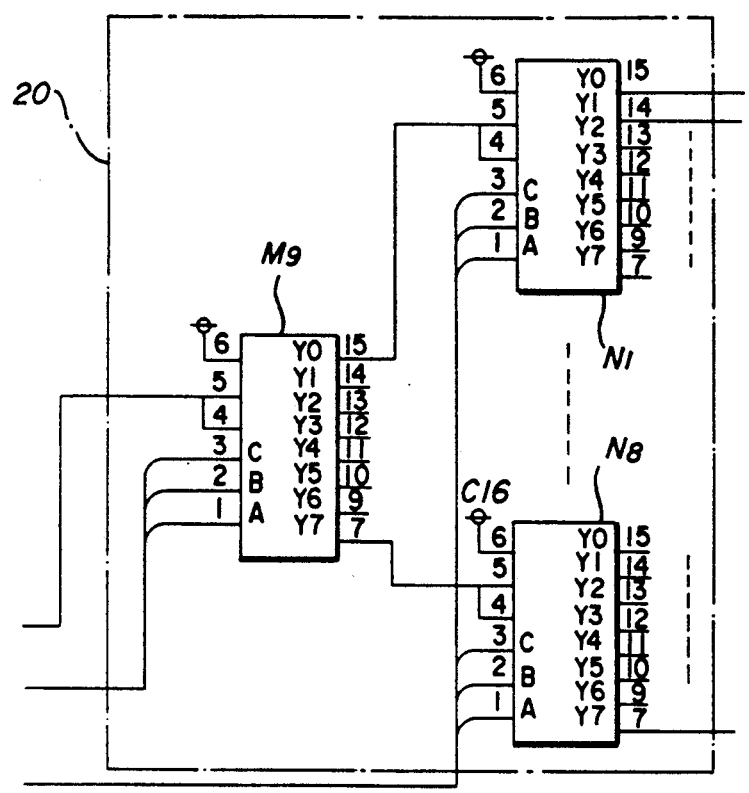
Figure 12B:
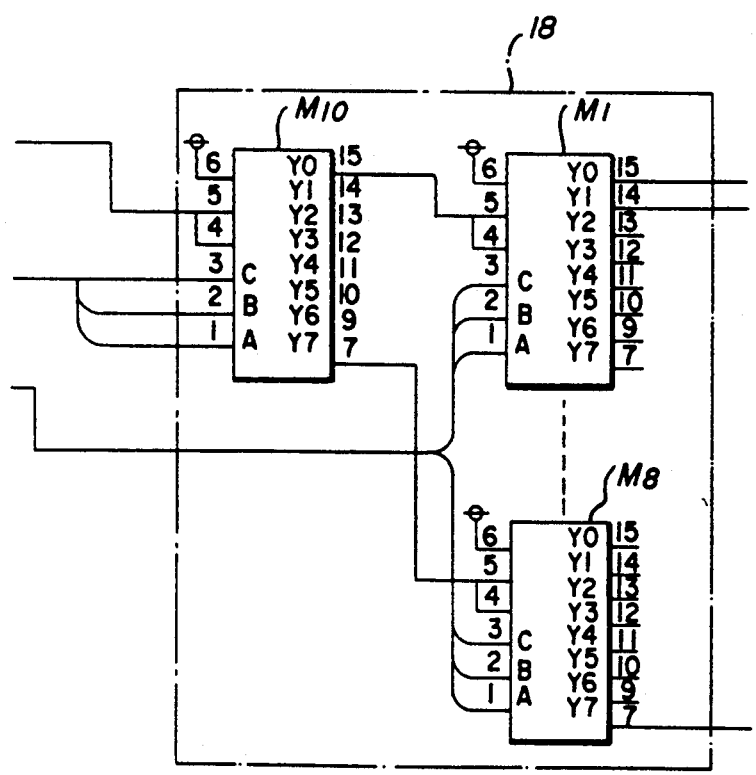
Figure 12C:
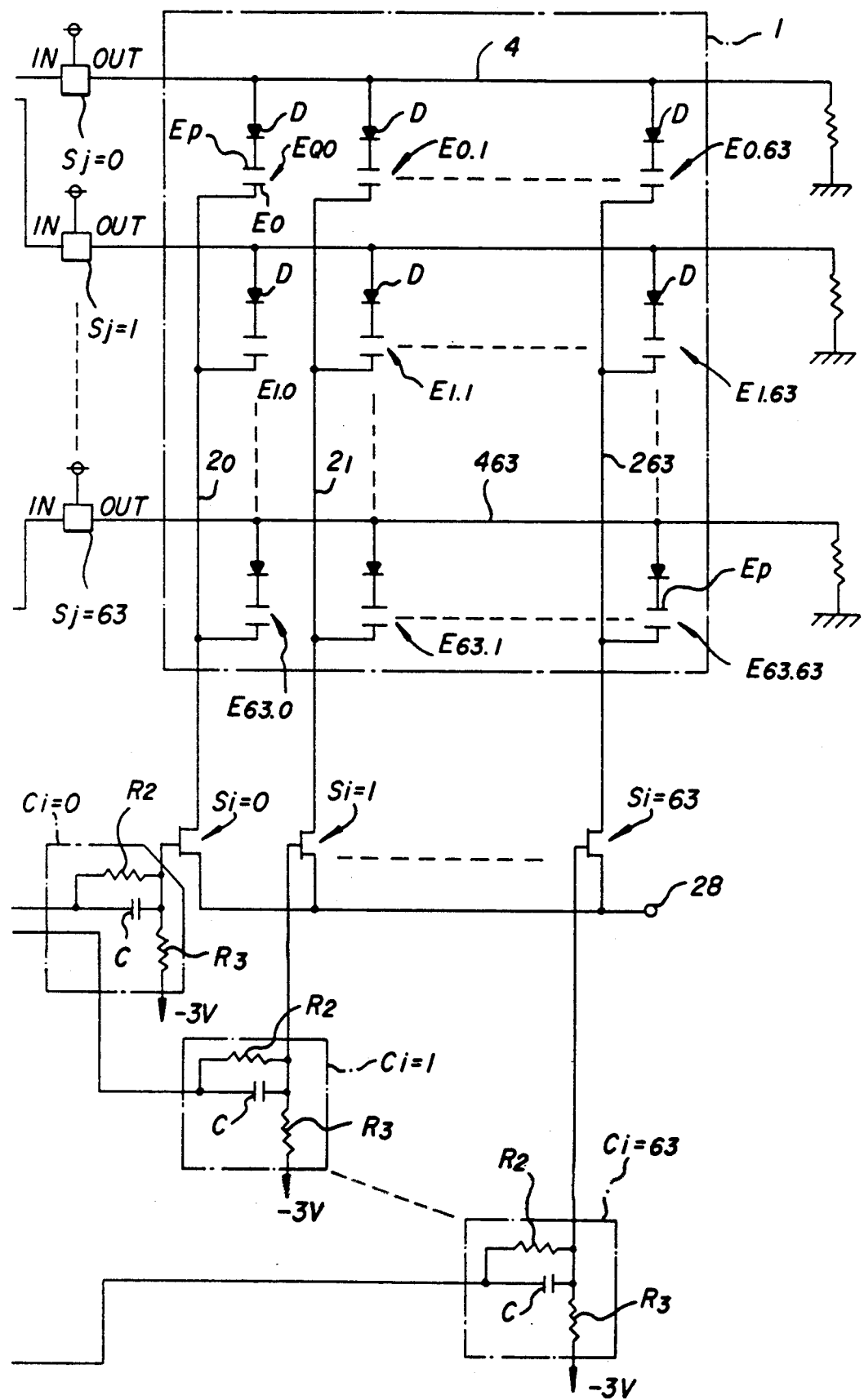

Now, a description will be given to the image display system according to the present invention, with reference to an embodiment thereof as illustrated in FIG. 14. It is possible to arrange such a system so that signals of the detected compression force (touch) at each of the sensing points in the distribution type tactile sensor or a tactile image sensor 1 according to the present invention are sent to an imaging unit 30 and therein converted to imaging signals, which are inputted through an image input device 32 to a personal computer 34, in which the signals are subjected to a prescribed processing. According to this system, it is possible to display the tactile detected detail of an object sensed by the tactile image sensor 1 in the form of an image on an image display unit 36, in which two monitors, comprising a monochrome (black and white) television tube and an RGB three-primary-color television tube, are used in the illustrated embodiment.

The image input device 32 used in the present embodiment had a pseudo-color-through function for displaying the input image wherein the image shape is changed with the lapse of time, comprising a 64-level gradient tone display function and a 4 stationary image display function. For the personal computer 34, use was made of a 640 KB NEC-PC9801 machine equipped with software providing main menus which enable image freezing, pseudo-colouring, image processing, enlargement/reduction, inter-image processing, histogram processing, image saving/loading, and so on.

Figure 15:
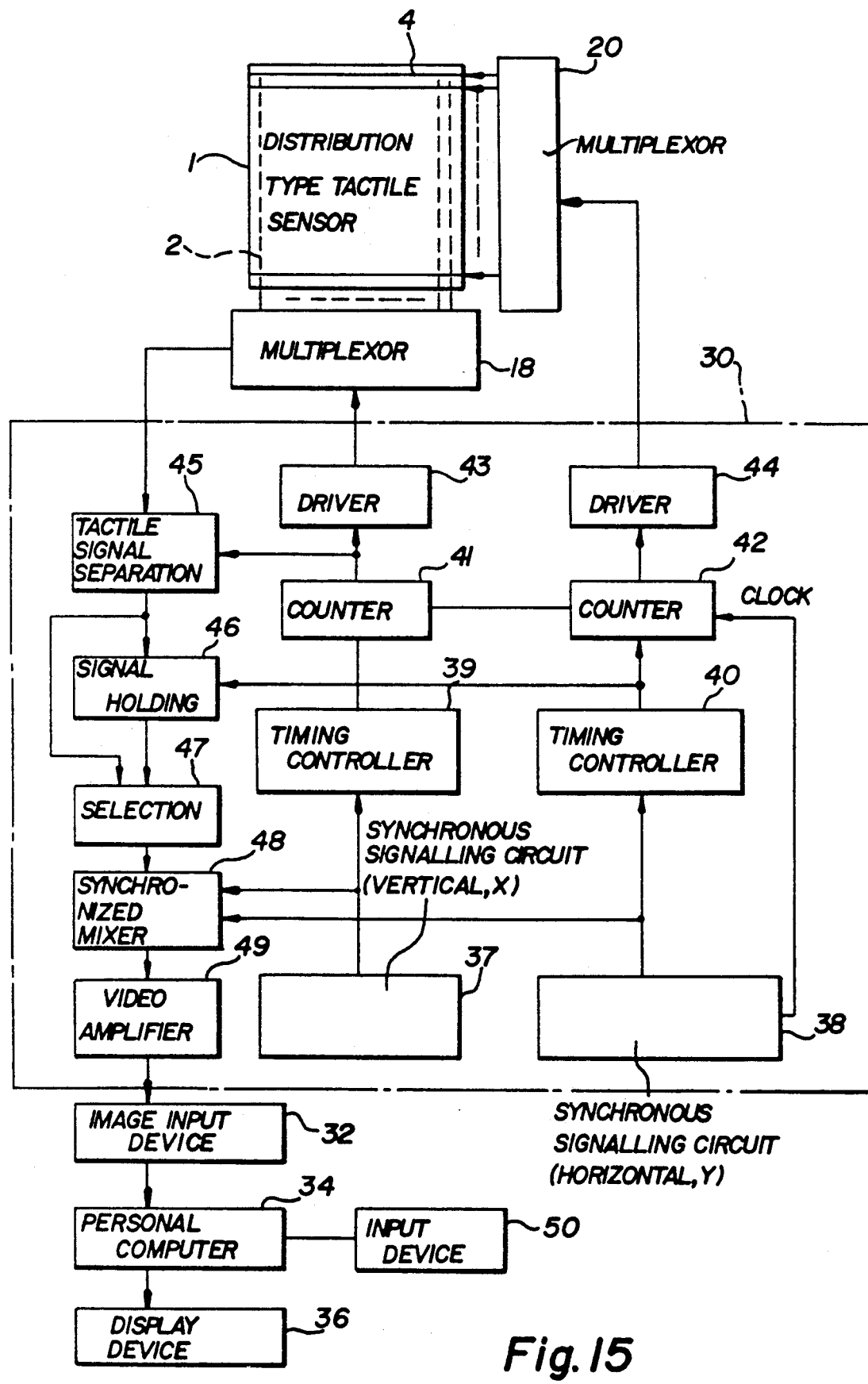
FIG. 15 is also a block diagram but shows an imaging unit in the image display system of FIG. 14.

Next, with reference to the block diagram of FIG. 15, a description will be given of an example of the imaging unit 30. FIG. 15 represents the system in which the plane shape of an object against which the tactile sensor 1 is contacted is displayed intact on the display device 36.

In the system illustrated in FIG. 15, the tactile sensor 1 is operated by the imaging unit 30 to scan respective electrode leads 2 and 4, and a voltage is applied successively to electrodes at the sensing points. The control in this respect is made as follows. Pulsed signals, which are generated from a synchronous signalling circuit 37 on the (vertical) side of the leads 2 and a synchronous signalling circuit 38 on the (horizontal) side of the leads 4, are subjected to a timing regulation by timing controllers 39 and 40 and are then sent to multiplexors 18 and 20 through counters 41 and 42, and decoders 43 and 44, whereby electrode leads 2 and 4 are scanned and switches (not shown) are successively operated to impress a voltage for sensing the resistance at respective sensing points. In the above, current is supplied from the multiplexor 18 to a contact signal divider circuit 45, in which the signals corresponding to the tactile detection (compression force) are selected out, and the signals are then sent to a synchronized mixer 48 through a return back period holding circuit 46 and a selection circuit 47. Then, the signals of touch-detected forces are amplified by a video-amplifier 49 synchronized with the image display device, then sent to the image input device 32. After the signals have been processed by the personal computer 34 according to a selected one of the above-described main menus depending on a command preparatively inputted from an input device 50, they are displayed on the display device 36.

Applications of the above-described image display system of the present embodiment include research and studies in medical fields and in the fields of the human-factors engineering, such as studies on the splayfoot, of which it is said that today more children suffer from this than ever before. In addition, studies and research on comfortable chairs, studies on decubitus suffered by aged people long in bed, and so forth, are possible. Also, in the field of education, the system can be effectively utilized, for example, in replacing the conventionally operated hand-to-hand guidance or education of such techniques as palpation, massaging, and so forth, with ones utilizing pictures and numerical values.

The tactile image sensor 1 in the above-described embodiment can considerably reduce the number of high-speed switching elements, so that it becomes possible to process data from a tactile image sensor having a number of sensing points for a high-speed image processing by a personal computer, whereby it is possible to considerably curtail the cost of the system. For example, a conventional system utilizing a mammoth computer costing at least 10 million Japanese Yen can be modified to a more widely utilizable system of a drastically reduced cost.

Further, by using a personal computer in the above system, changing of programs can be easily made, so that the system can have a high versatility, capable of meeting a variety of demands, even though the high-speed performance may indispensably be sacrificed depending on particular demands.

Figure 16:
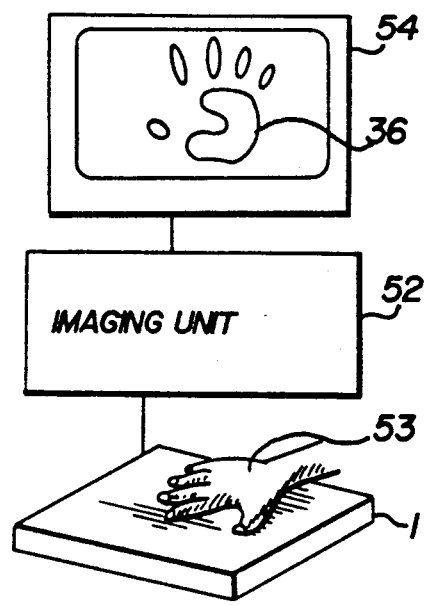
FIG. 16 is a view, showing a use condition of the image display system of FIG. 14.

FIG. 16 illustrates the operation of the above image display system. When the palm 53 of a hand is pressed against the tactile image sensor 1, according to the above-described operation processes the compression force (touch) at respective sensing points is detected, processed and displayed as an image of the palm 53 on the display device 36 (in FIG. 16, the above-described devices and units 30 to 34 are shown in collection as an image processing device 52). The display can optionally employ any one of various manners of displaying such as a real time displaying, displaying as a stationary picture, displaying in contrast of brightness and darkness, displaying in gradient brightness or color tones corresponding to the strength of forces with which the contour or respective portions of the palm is pressed, displaying in the form of a contours diagram, and displaying as a histogram of compression forces on a diagram of the sensing points.

Figure 17:
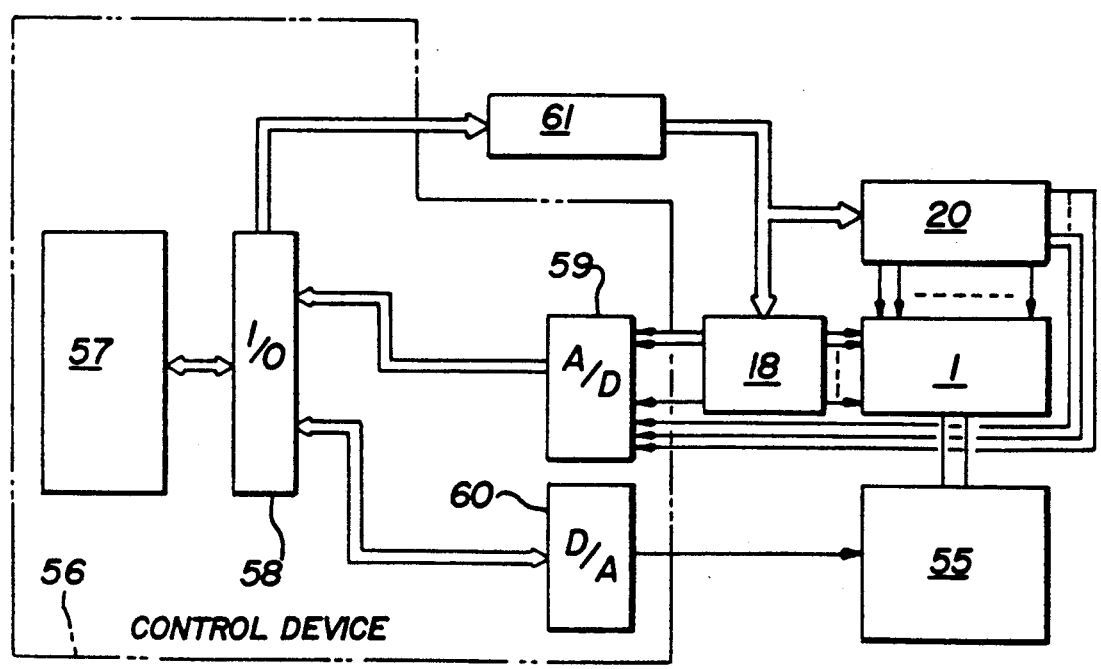
FIG. 17 depicts a block diagram of a control system used in a robot's hand.

Now, with reference to FIG. 17, a description will be given of the essential points of a control system in the instance in which the distribution type tactile sensor according to the present invention is applied to control the holding power of a robot's hand. The tactile sensor used in the present embodiment comprises an 8×8 matrix arrangement, which was used for sensing contact pressure, and feed switches and output switches (8 switches on each of the feed side and the output side) were each adapted to an analog control. In FIG. 17, the robot's hand shown by 55 is controlled by a control device 56 based on detected signals from the tactile sensor 1. The control device 56 was composed of a one-chip microcomputer 57, an input/output device 58, an A/D converter 59 for converting current signals corresponding to contact pressures into digital values, and a D/A converter 60 for converting signals for controlling the holding power of the robot's hand 55 into analog signals.

The above described distribution type tactile sensor according to the present invention can be effectively applied as means for controlling contact pressure, having a simple structure and yet exhibiting a high control accuracy, in the cases of controlling, for example, the holding or grasping power of robots.

Now, with reference to FIG. 18, a description will be given of the structure of a plate type sensor which is suited to receive a human candidate thereon and is chiefly suitable for detecting an image of a sole or soles of the feet of a human candidate contacting the sensor. The electrode used in the present embodiment had a pattern of a swastika shape as shown in FIG. 19, even though it is similarly effective if use is made of an electrode of a comb-type shape as shown in FIG. 3.

Figure 18:
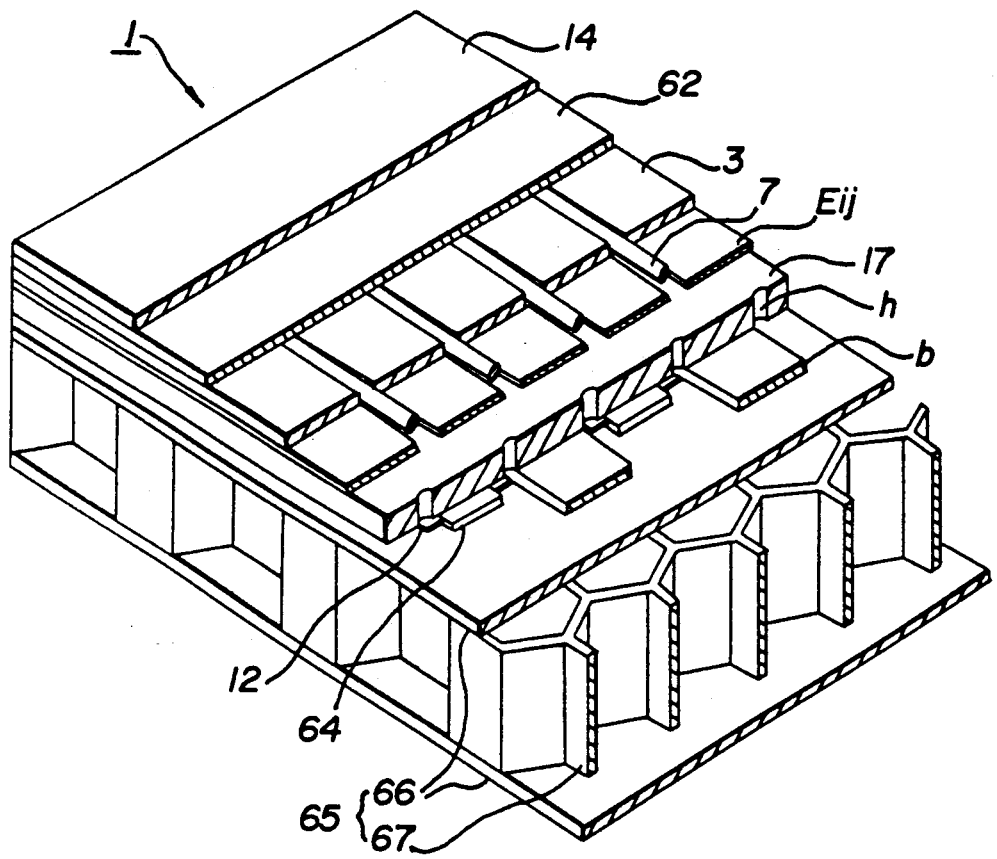
FIG. 18 is a partly broken-away perspective view, showing a plate type sensor device adapted to have mounted to thereon a human body or an object.
Figure 19:
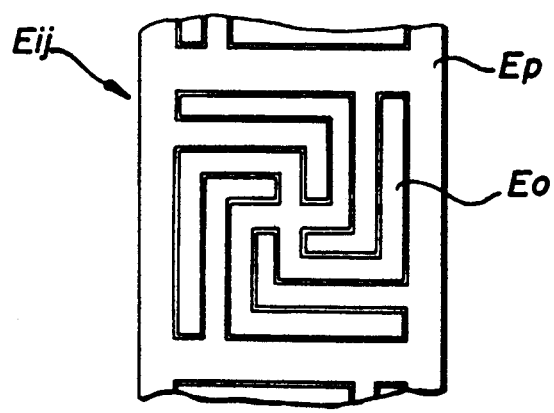
FIG. 19 shows a pattern of electrodes for use in or for the distribution type tactile sensor device shown in FIG. 18.

FIG. 18 is a partly broken-away perspective view, showing a touch sensor 1 with a portion thereof cut away. As shown, the tactile sensor 1 comprises a printed circuit plate 17 provided with electrodes Eij formed by printing electrodes and electrode leads integrally and in a belt-like form plies of belts of a pressure sensitive conductive rubber 3, formed in belts similarly to the electrodes Eij, are provided on which a cover 62 (0.5 mm thick) made of a urethane rubber is applied. On the upper surface of the cover 62, a (tactile or touch) surface forming member 14 of a high quality paper printed with the prescribed pattern on the upper surface thereof is applied, in which the peripheral edges of the surface forming member 14 and the cover 62 are appropriately fixed. Between adjacent belts of the pressure sensitive conductive rubber 3, a separator is further arranged.

In the printed circuit plate 17, the swastika-shaped electrode Ep (FIG. 19) is formed in a central region thereof with a conductive through-hole h, to which there is connected by soldering a mini-mold member 64 having diodes D capsulated two each therein, for preventing the generation of stray currents, and to which also connected are electronic parts such as IC's (not shown) and diodes required for the printed wiring (not shown). The electrode Ep (FIG. 19) comprises a belt-like structure having a hole formed therein by the removal of an electrode Eo. Further, in FIG. 18, an illustration of the swastika-shaped electrodes is not shown.

Between adjacent mini-mold members 64, backing-up members b comprising a belt-like urethane material and having a thickness (2 mm thick) greater than that of the mini-mold members are disposed, and under the backing-up members b, there is disposed a sandwich structural body 65 comprising an an integrally formed aluminium honeycomb structural body. The sandwich structural body 65 comprises a honeycomb member 67 sandwiched between a pair of reinforcing plates 66, and this structural body 65 is adapted for placement on a floor (not shown).

The sandwich structural body 65 can be manufactured to be relatively thin and yet highly strong with a simple structure, and by using it, it is possible to provide a sensor which can stand a high concentration of load, for example 300 kg.

By making the pressure sensitive conductive, rubber 3 in the form of belts and by arranging separators between adjacent belts of the rubber 3 as above, it is possible to suppress the extent of deformation or displacement of the contact surface which is likely due to forces to be produced in lateral directions when a human candidate gets on or down from the contact surface. Also, the tactile or touch surface forming member 14 and the cover 62 thereunder serve to prevent forces acting in the lateral directions from easily being transferred to the respective members under them.

Then, with reference to FIGS. 20, 21 and 22, a description will next be given to a distribution type tactile sensor adapted to applications of curved surfaces, and also of the manners of use thereof.

As shown, unit sensors 1o comprise a pressure sensitive conductive rubber 3 and electrodes $E_o$ and $E_p$, and respective unit sensors 1o are connected together by output-side electrode leads 2 and feed-side electrode leads 4 to provide tactile pressure sensing circuits. The feed-side electrode leads 4 of each unit sensor 1o are connected to a multiplexor 20, while the output side electrode leads 2 are connected to a multiplexor 18.

Respective electrode leads 4 are successively connected to a power source (+B) by switches comprising a transistor Tr, which undergoes on-off operations responsive to signals from the multiplexor 20. Respective electrode leads 2 are successively connected to an output line O.P. by switches comprising FETs which undergo on-off operations responsive to signals from the multiplexor 18. Therefore, by scanning the electrode leads 2 and 4, it is possible to successively sense the resistance of each unit sensor 1o through the single output line O.P.

Figure 20:
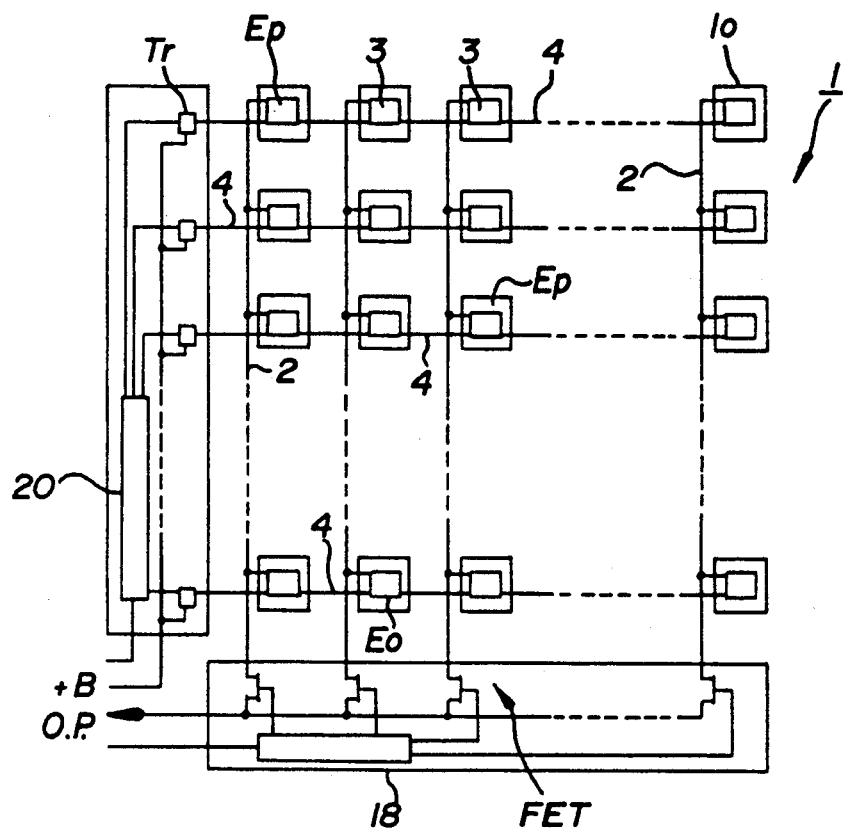
FIG. 20 shows a schematic view of a sensing circuit in or for a distribution type tactile sensor adapted to curved surfaces.
Figure 21:
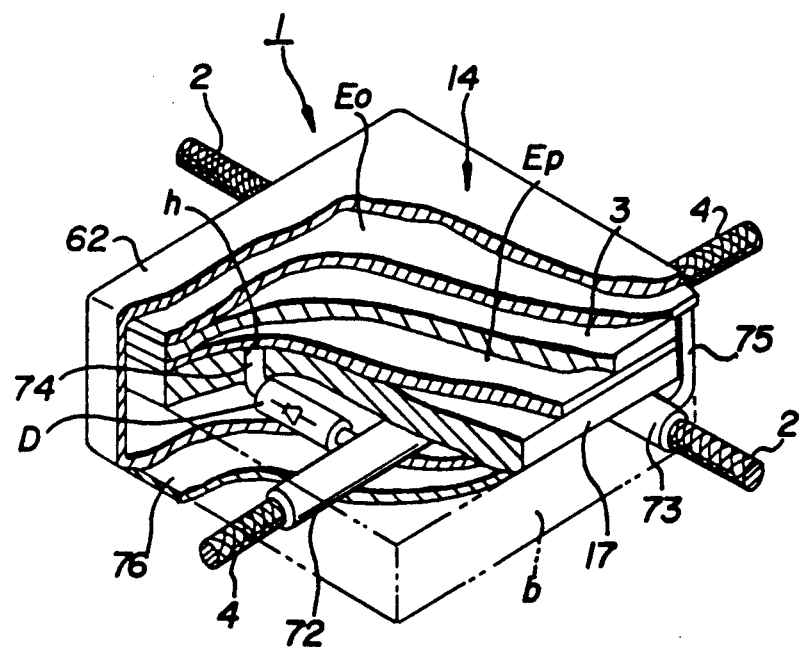
FIG. 21 shows a partly broken-away perspective view of an example of unit sensors for use in or for the distribution type tactile sensor shown in FIG. 20.

FIG. 21 is a perspective view, showing the unit sensor 1o of FIG. 20 with a portion thereof broken away, in which the electrode Ep connected to electrode leads 4 comprises a printed electrode on a substrate plate 17, on which a pressure sensitive conductive rubber 3 is disposed, and on which the other electrode Eo is laminated. The periphery of this unit sensor is wholly encased in a cover 62 of a sealing material such as a modified urethane rubber. Thus, in the present embodiment, the front-side face of the electrode Eo is arranged on the side of the pressure bearing surface (touch surface) 14.

Under the substrate plate 17, terminals 72 and 73 are disposed, which do not conduct to each other. The terminal 72 is connected to the electrode Ep through a conductor 74 filled in a through-hole h in the substrate plate 17, and a diode D is connected to the conductor 74. The terminal 73 is connected to the electrode Eo through a conductor 75. Thus, the electrode Ep should be connected to a power source so that, through the diode D, it comprises a positive polarity.

Terminals 72 and 73 on the one hand and electrode leads 2 and 4 on the other hand can be connected to each other by any of such as soldering, a plug-socket arrangement and staking or calking. Further, in FIG. 21, the reference numeral 76 denotes an adhesive sheet with which the unit sensor 1o may be attached to an object to be sensed.

Figure 22:
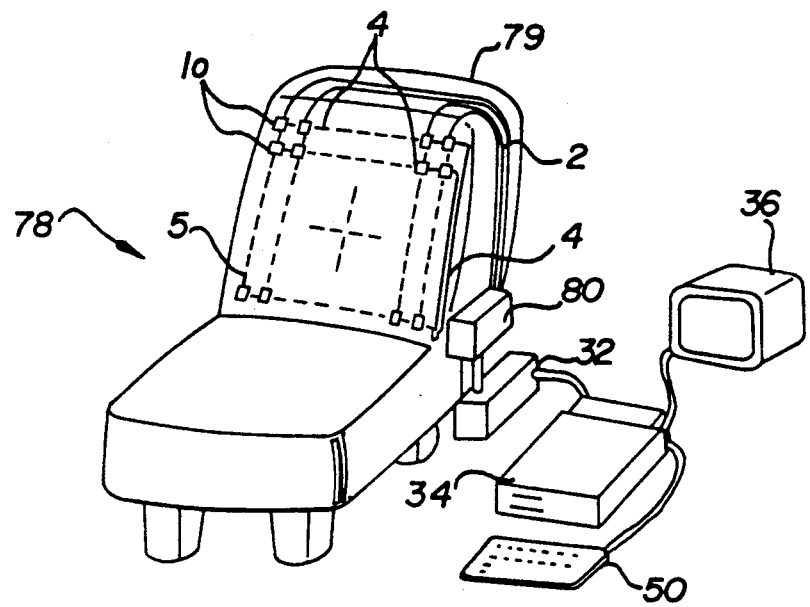
FIG. 22 is a perspective view, showing an example of use of the distribution type tactile sensor of FIG. 20.

FIG. 22 shows a perspective view, illustrative of a manner of application of the curved surface tactile sensor 1 of the present embodiment, which is applied to a chair. As shown, a plurality of the unit sensors 1o shown in FIG. 21 are set in a chessboard arrangement on the back cushion 79 of the chair 78, forming a curved surface, and each of the electrode leads 2 and 4 is connected to a terminal box 80 housing multiplexors 18 and 20, as shown in FIG. 20, therein. Tactile pressure signals are displayed in terms of numerical data or contours on a display device 36 through an imaging unit 30. According to the described system, it is possible to determine the relationship between the configuration of the chair and the physical construction and/or the posture of a user of the chair in terms of dynamic characteristic data.

Figure 23:
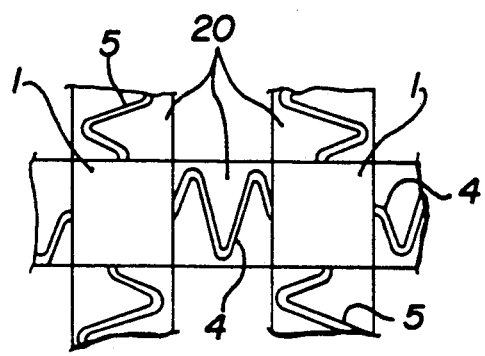
FIG. 23 shows a partial plan view of an example of electrode leads in or for the tactile sensor of FIG. 20.
Figure 24:
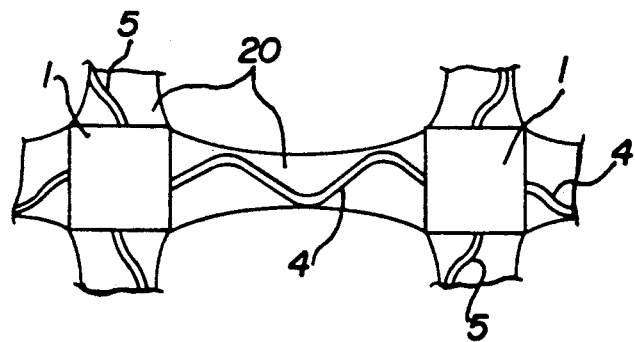
FIG. 24 shows a stretched condition of the electrode lead of FIG. 23.

In FIGS. 23 and 24, respective electrode leads 4 and 5 are fixed in a zigzag arrangement to a stretchable ribbon-type member 20, whereby the ease of handling of the tactile sensor 1, shown in FIG. 20, is increased. As the distance between adjacent unit sensors 1o which are arranged in a relatively large spacing is increased, the electrode leads 2 and 4 undergo stretching together with the ribbon-type member 20. When a sensing operation is over and the pressure application is then removed, the ribbon-type member 20 can return to its original condition, so that the electrode leads 2 and 4 can be prevented from undergoing tangling and the handling of the touch sensor can be facilitated.

Figure 25:
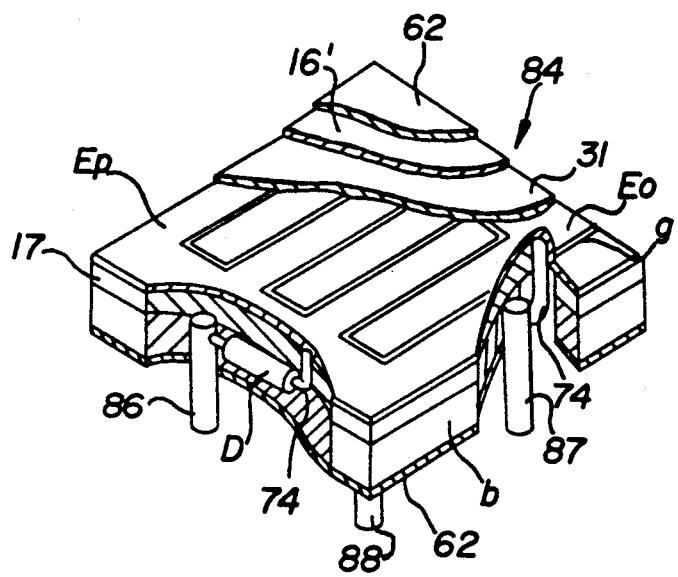
FIG. 25 shows a modified example of the unit sensor of FIG. 21.
Figure 26:
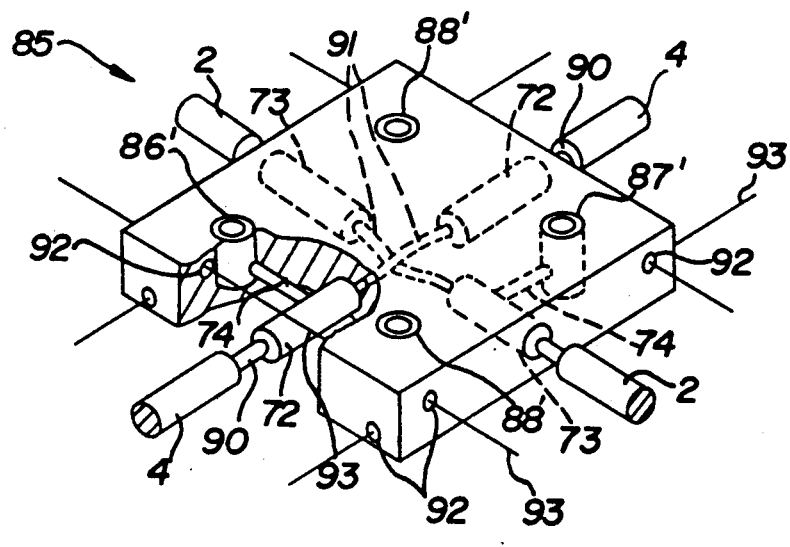
FIG. 26 shows a connector portion in FIG. 25.

FIGS. 25 and 26 show respectively in a perspective view a unit sensor 1o for attaching to a robot's hand, which comprises mutually separate sensor parts 84 and connector parts 85, of which the sensor part 84 is exchangeable. Unit sensors 1o are connected to one another by a mechanical liking member so that the sensor part 84 can be prevented from undergoing an excessive force application. In the condition in which the sensor part 84 and the connector part 85 are together assembled, the size of the unit sensor 1o is approximately 5×5×5 (mm).

Electrodes Ep and Eo comprise the so-called comb-shaped electrodes formed by print wiring, and in the gap g between the electrodes Ep and Eo, an insulating material is filled to prevent short circuiting from occurring. On the electrodes Ep and Eo, there is applied a pressure sensitive conductive rubber layer 3′ formed by coating a pressure sensitive conductive coating material, on which a conductive layer 16′ formed by a conductive coating material is further provided. On the underside of the sensor part 84, there are provided a conductor pin 86 to be connected to a diode D, a conductor pin 87 to be connected to the electrode Eo through a conductor 74, and two pins 88 merely consisting of a mechanical connection member (one of the two pins does not appear in FIG. 25). By the four pins 86, 87, 88 and 88, the sensor part 84 is fixed to the connector part 85.

The connector part 85, which is made of a resin, is provided with sockets 86′, 87′ and 88′ (two) into which the above pins are inserted, of which the socket 86′ is connected through a conductor 74 to a terminal 72 joined to a connector pin 90 provided to the electrode lead 4, whereby the electrode Ep and the electrode lead 4 are connected to each other. The above described four pins 86, 87, 88 and 88 mechanically and detachably connect the sensor part 84 and the connector part 85 to each other. Further, the reference numeral 91 denotes conductors connecting terminals 72 and 72 together and terminals 73 and 73 together.

A plurality of connector parts 85 (the illustration is limited to only one) are vertically and laterally arranged by connecting cords or strings 93 applied through through-bores 92 to altogether form the sensing part of the curved surface tactile sensor shown in FIG. 20. The unit sensor 1o shown in FIGS. 25 and 26 is suitable for attachment to a non-plane portion of a robot's hand, for gripping an object therewith.

Figure 27:
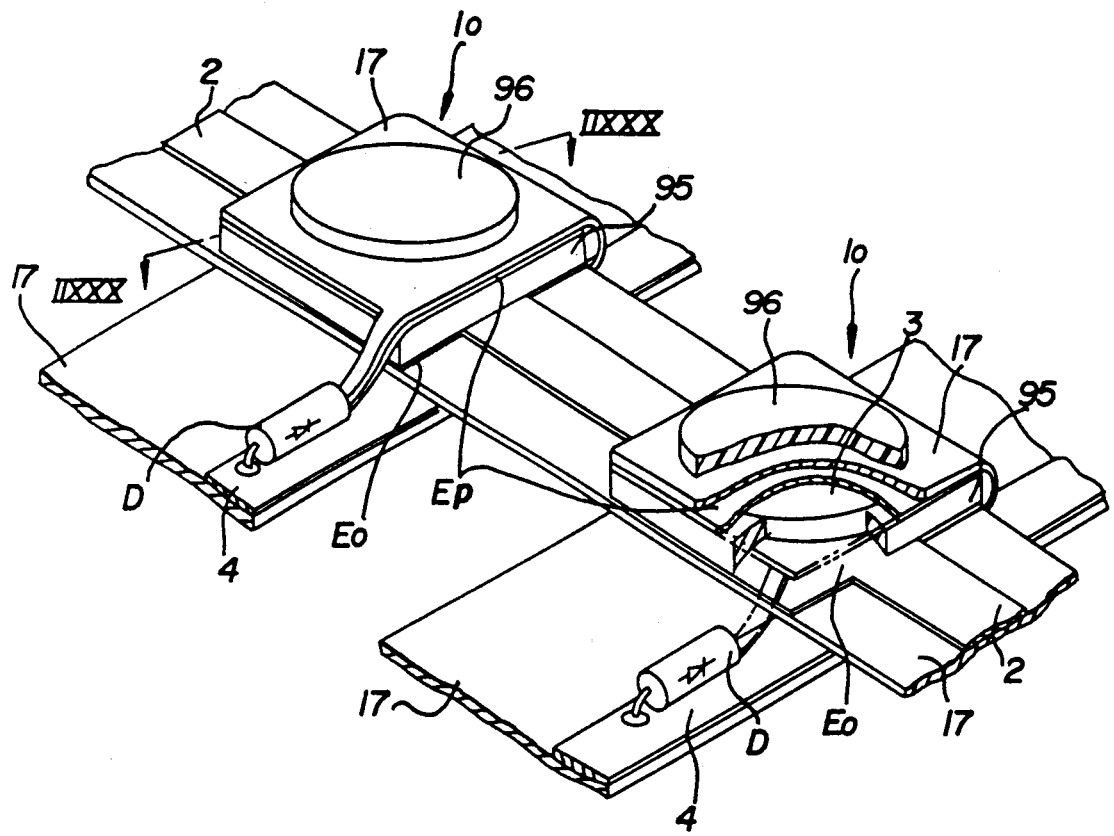
FIG. 27 is a partly broken-away perspective view, showing another modified example of the unit sensor of FIG. 21.
Figure 28:
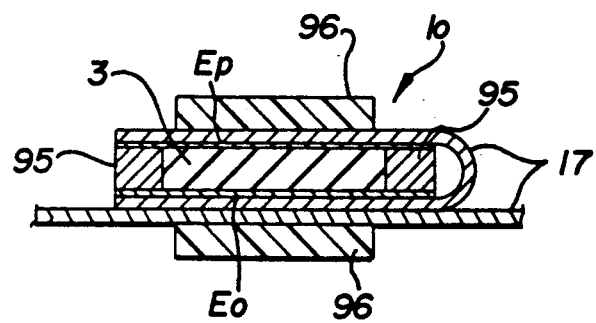
FIG. 28 shows a sectional view, taken on the line IIXXX—IIXXX in FIG. 27.

With reference to FIG. 27 and FIG. 28, a sectional view taken on line IIXXX—IIXXX of FIG. 27, a description will be given to another modified example of the embodiment shown in FIG. 21. The unit sensor 1o of the present embodiment comprises an electrode Ep (or Eo) attached on one side surface of a spacer 95 comprising an insulator formed with a through-hole for fitting a pressure sensitive conductive rubber 3 therein and a pressure bearing plate 96 comprising, for example, a resin plate, attached to the pressue sensitive conductive rubber 3, on the outer side of the electrode Ep (or Eo).

For the flexible electrodes Eo and Ep and the electrode lead 2 (or 4), use may be made of any of products prepared by etching a flexible circuit substrate plate, and products prepared by printing patterns of electrodes and electrode leads on a flexible film such as polyester films. Preferably, surfaces with the electrodes Eo and Ep should be treated with a material such as gold plating and treated with carbon in order to prevent a contact resistance from being generated.

As shown in FIG. 28, in the present embodiment electrodes Eo and Ep and the electrode lead 2 are formed by etching the conductive layer on a single flexible printed circuit board 17, which is folded in two with a spacer 95 interposed therebetween, to provide electrodes of a sandwich structure. The pressure bearing plate 96 can accurately transmit the pressure applied thereon to the pressure sensitive conductive rubber 3, and in the illustrated embodiment, it has a diameter appreciably smaller than that of the pressure sensitive conductive rubber 3. This pressure bearing structure can be provided in any of appropriately modified manners. For example, as an alternative means for providing a pressure bearing member, it is envisaged to dispose a small plate piece having a further smaller diameter than the above plate 96 in the vicinity of the center of the rubber 3, and place a flexible pressure bearing sheet on the plate piece so that the pressure applied on the pressure bearing sheet can be transmitted, at a central region of the sheet, to the pressure sensitive conductive rubber.

As shown in FIG. 27, the diode D for preventing a stray current from flowing is connected at its one end to an extended elongate portion of the electrode Eo and soldered at its other end on the electrode lead 4 formed on the flexible printed circuit board 17. A portion of the printed circuit board 17 removed of the conductive layer is contacted with the flexible printed circuit board 17 on the side of the electrode Eo, and on the surface thereof, similar pressure bearing plate as the above plate 96 is attached. The tactile sensor 1 for curved surfaces shown in FIGS. 27 and 28 is simple in structure and easy to produce and handle, and was found to possess a remarkable sensing performance.

With reference to FIG. 29 to FIG. 32, a description will next be entered into the instance of applications of the present invention in which the tactile sensor according to the invention is utilized in order to obtain data for designing shoes. The tactile sensor 1 of the present embodiment consists of a flexible sensor formed of a rubber for a shoe sole and comprises a heel-part sensor 99 and a sole- or front-part sensor 100, attached to the sole of a shoe 98.

Figure 30:
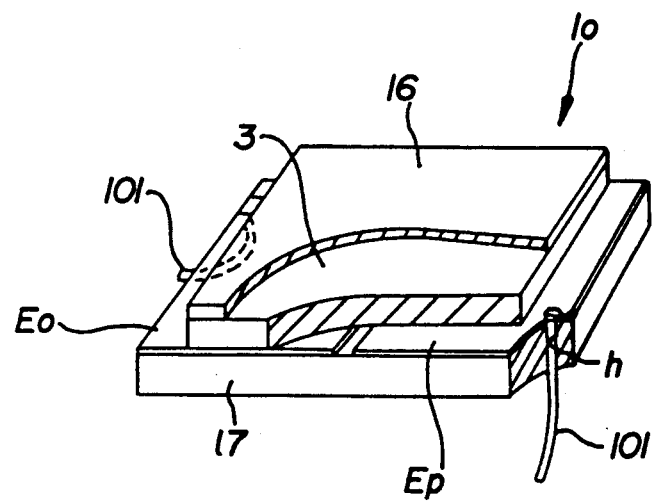
FIG. 30 is a partly broken-away perspective view of a unit sensor for use in or for the tactile sensor of FIG. 29.

As shown in FIG. 30, the unit sensor 1o used in or for the sensors 99 and 100 is composed of electrodes Eo and Ep parallel arranged on, for example, a printed circuit board 17. Leading wires 101 and 101 are applied through through-holes h in the circuit board 17, and connected to electrodes Eo and Ep by soldering and extended beyond a backside side or underside surface of the circuit board 17. A pressure sensitive conductive rubber 3 is placed on the electrodes, and a conductive film 16 is disposed on the rubber 3 opposite the electrodes Eo and Ep.

A multiplicity of unit sensors 1o is sealably embeded sensor by sensor in a rubbery block 102 having a convex contour. By way of an example, the blocks are of a size of about 6 mm in length in a longitudinal direction and about 8 mm in length in a lateral direction, and the unit sensors 1o have a size of about 3 mm×6 mm. In the illustrated embodiment, the electrodes Eo and Ep comprise parallel arranged rectangular electrodes, but they may comprise electrodes of any other shape, for example a comb-type shape.

Figure 29:
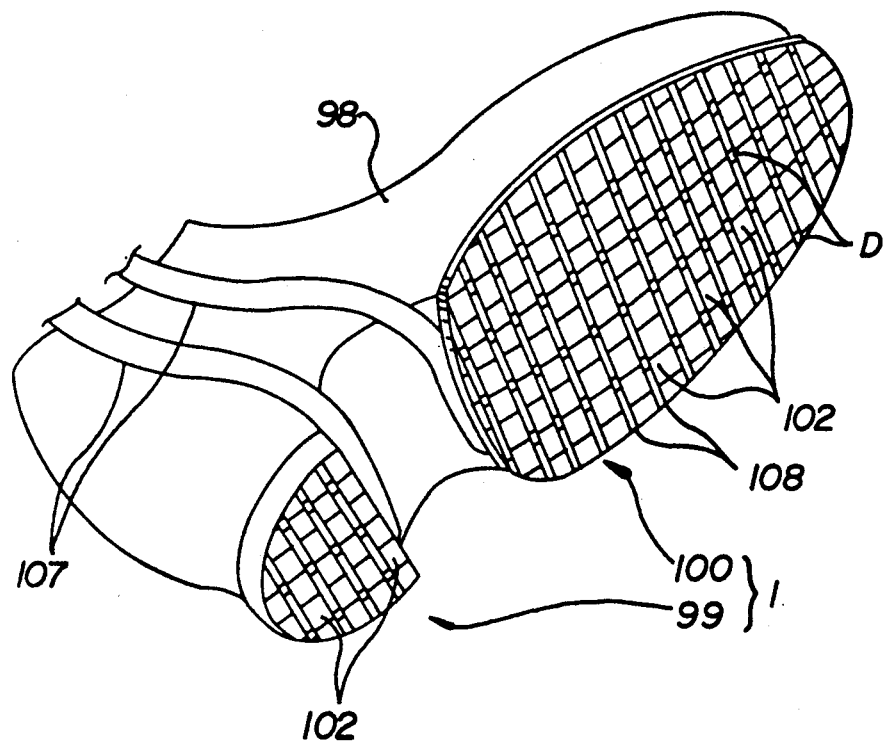
FIG. 29 shows a perspective view of a shoe incorporating a distribution type tactile sensor.

The convex block 102 is provided with a recess 103 in which a unit sensor 1o is placed and sealed with a filling material 104 comprising for example a rubber, in the condition in which the lead wires 101 are externally projected. As shown, the pressure bearing part in the recess 103, indicated at 105, is structured to have an increased thickness in comparison to the peripheral part of the block 102 so that a load applied can be concentrated on the unit sensor 1o. In FIG. 29, the blocks 102 are disposed in a line arrangement in the lateral direction, and in the longitudinal or back and forth direction there are provided grooves 108 in which to place diodes D for preventing stray current generation, the diodes D being disposed over a whole of the heel-part sensor 99 and the front-part sensor 100.

Figure 31:
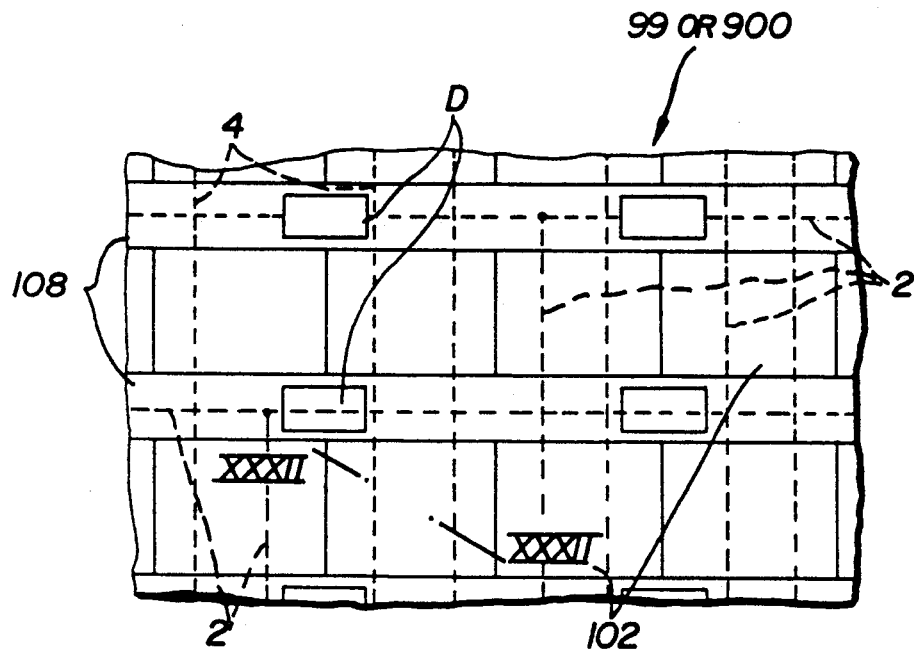
FIG. 31 is a plan view, showing essential portions in FIG. 30, in an enlarged scale.
Figure 32:
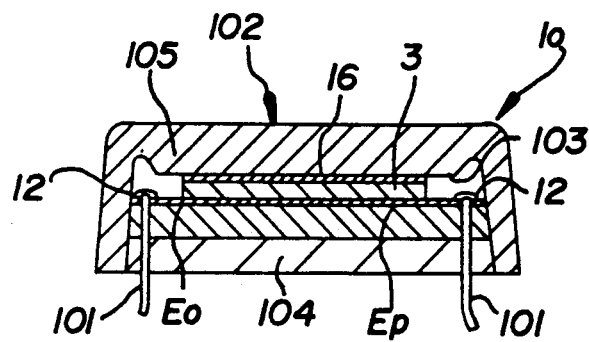
FIG. 32 is a sectional view, taken on the line XXXII—XXXII in FIG. 31.

Blocks 102 shown in FIG. 29 are individually fabricated as shown in FIG. 32 and are bonded on a substrate board which is not shown, in an arrangement such that, as shown in FIG. 31, while they lie close to one another in the lateral direction, they are spaced from one another by grooves 108 in the back and forth direction. As an alternative means to this, it is also possible to integrally form the blocks 102 and the grooves 108, and after the unit sensors 1o are sealed as stated above, to attach the resulting product by bonding onto a substrate comprising a shoe sole material, such as a rubber, which is not shown.

Electrode leads 2 and 4 shown by broken lines in FIG. 31 are connected to the lead wires 101 from the blocks 102 so as to form the sensing circuit shown in FIG. 20. Further, whereas the diodes D may be arranged either on the side of the electrodes Eo or that of the electrodes Ep, as long as they are connected in a correct direction electricially in the illustrated embodiment, they are provided on the side of the electrode Eo. After connection of respective wires is finished, the heel-part sensor 99 and the front-part sensor 100 are attached to the sole of the shoe 98. Further, the reference numeral 107 in FIG. 29 denotes wire harnesses comprising the electrode leads 2 and 4.

The tactile sensor 1 shown in FIG. 29 differs from each of the previously described tactile sensors 1 in that the number of electrodes attached to the electrode leads 2 and 4 is not constant but is locally varied. Thus, in the tactile sensor 1 according to the present invention, it is not always necessary that electrodes are provided in a chessboard arrangment or that spacing of the electrodes is constant.

Now, with reference given to FIGS. 33 and 34, a description will be made of an adaptor which makes it possible to suitably change the touch density.

Figure 33:
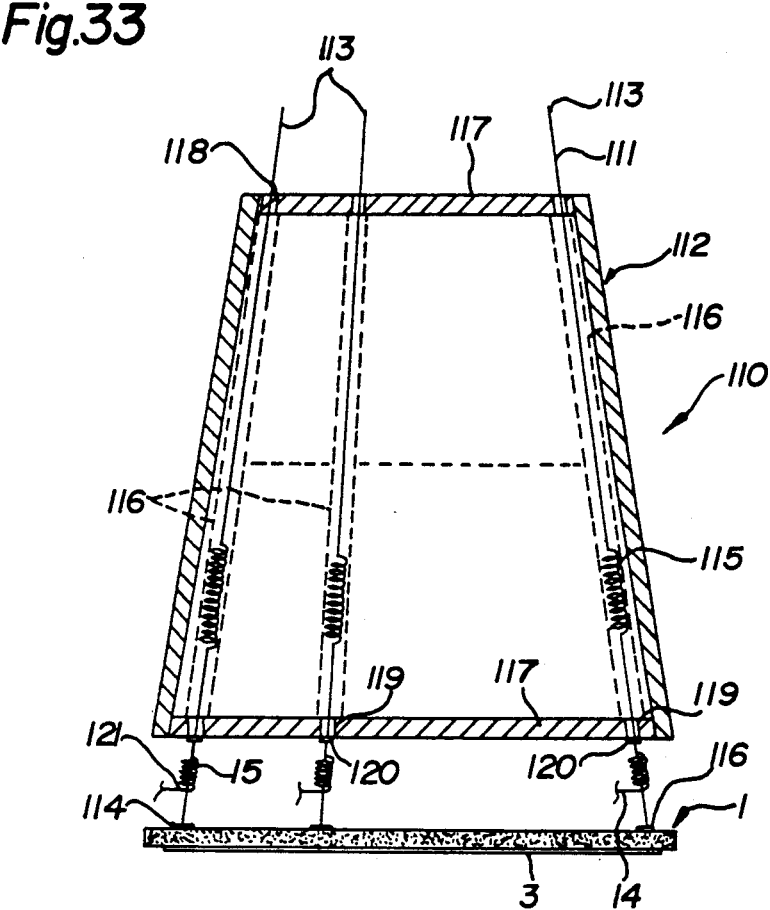
FIG. 33 shows a sectional view of an adaptor for increasing the sensing density.

FIG. 33 shows an adaptor 110, which is composed of a plurality of pins 111 and a pin holder 112. Each pin 111 has a sensing end 113 for contact with an object and a touch transmission end 114 provided with a pressure piece for pressing against a tactile sensor 1. The pin 111 is intermediately provided with a spring 115 so that the sensing end 113 can undergo motion of a stroke greater than a deformation stroke of a pressure sensitive conductive rubber 3. In the present embodiment, in order to facilitate smooth transmission of force, use was made of such a device in which the pin 111 was inserted through a tubular guide 116 made of for example a soft spring. The guide 116 is effectively useful also in the cases in which the pin 111 is provided in a curved condition. Also, means can be taken for example to apply a cap of a synthetic resin to the sensing end 113 of the pin 111 so that this end 113 can contact an object softly.

The pin holder 112 comprises a plate-type holding part 117 on the side of the sensing end 113 and a plate-type holding part 117 on the side of a tactile sensor 1, holding the pins 111 and guide 116 in postion. One of the holding parts 117 is provided with bores 118 for passing pins 111 therethrough, so as to provide points at which the sensing ends 113 of the pins 111 are to be matrix arranged. The other of the holding parts is provided with bores 119 also for pins 111, so as to locate the touch transmission ends 114 on the prescribed points on the tactile sensor 1. Stoppers 120 are appropriately provided so as not to allow the pins 11 to come out of the holder 112.

Lead wires 121 connected to touch transmission ends 114 are electrically connected to pins 111 through wrapping parts 122 made by coiling a linear elastic body so that they can function also as a member biasing the pins 111 outwardly.

Although this arrangement is not shown, the pin holder 112 is fitted in the prescribed position in the tactile sensor 1 and fixed by screws. As a matter of course, it is possible to detachably secure the pin holder 112 to the sensor 1 by any other suitable means. Therefore, by providing a variety of pin holders 112 having different sensing or analytic capacities, it is possible to enhance the versatility of the tactile sensor 1. Further, if the provisions of bores 118 and 119 are reversed in comparison to the above arrangement, then it is possible to broaden the sensing area for each sensing operation.

In the arrangement shown in FIG. 33, directions in which pins 111 extend are at an inclination relative to one another, so that a problem is likely that as pins 111 are pressed in and out, distances among sensing ends 113 undergo changes. To avoid this problem and to maintain distances among the pins 111 constant, it is possible to make the bores 118 in the holding parts 117 have a relatively great length, to provide an additional holding plate 117 having bores 118 in a same positional arrangement as in the other holding plate 117 and/or to arrange the pins 111 in a parallel disposition on the side of the sensing ends 113. By making a same arrangement as above also on the side of the touch transmission ends 114, it is possible to ensure that forces are applied at right angles to the tactile sensor 1.

Figure 34:
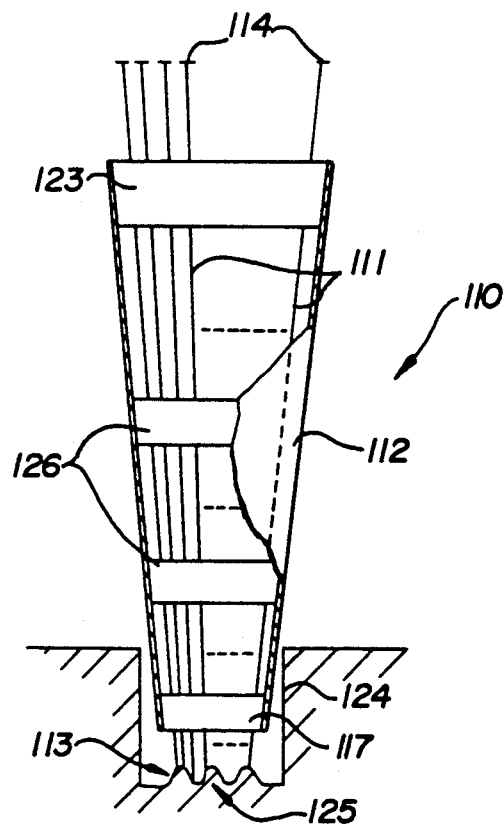
FIG. 34 is a sectional view of an adaptor for sensing convex and/or concave surfaces in a recessed part or portion of an object.

FIG. 34 is a view, taken for illustration of another embodiment representing the instance in which concave and convex irregularities on the bottom in a relatively small hole or cavity are detected, and it shows an operation condition in which a concave or convex portion 125 at the bottom of a hole 124 shown in a sectional view is detected by pins 111. In the adaptor 110 shown partly broken away, pins 111 are held by holding parts 117 and 123 and also by a plurality of intermediate holding parts 126, provided in a pin holder 112, in an arrangement such that distances among the pins 111 required at the side of the touch transmission ends 114 are narrowed compared to distances required at the side of the sensing ends 113.

FIG. 34 shows the condition in which the sensing ends 113 are in abutment against the concave and convex portion 125 at the bottom of the hole 124, and wherein tactile contact by the sensing ends 113 is transmitted to electrodes. Further, although this is not shown in FIG. 34, in a same manner as in FIG. 33, pins 111 are provided with springs 115, stoppers 120, lead wires 121 and wrapping parts 122, so that concave and convex surface conditions in small or narrow holes can be detected. Also, if the pin holder 112 of the present embodiment is made capable of being bent, it becomes possible to detect concaves and convexes which are externally invisible.

In the field of electronic appliances, lately it has been increasingly demanded that a reduction in size should be incessantly realized, and to cope with the demand, it is urged to increasingly effect a densification of the wiring to be printed on a printed circuit board, to increasingly miniaturize various parts such as chips to be mounted on the printed circuit board and to reduce the interpart spacing.

In connection with the above, it is required to perform inspections or examinations to determine whether the wiring is free of errors, one of which is an inspection or examination for determining if the prescribed parts are provided at their prescribed locations. Now that various minute parts and elements are arranged in a close relative arrangement, it is difficult to perform the above required inspection visually or with an eye, so that today the inspection is operated by pressing the printed circuit board against a board provided with a number of pins for detecting convex and concave surfaces thereof by a tactile sensor. Using the adapter described above with reference to FIG. 33 and outputting the result of detection in the form of the prescribed image on a display device such as CRT, it is possible to enhance the accuracy and the operation efficiency of the inspection.

In the embodiments shown in FIGS. 33 and 34, the touch transmission ends 114 are formed as electrodes of one of the two polarities, but it alternatively is possible to provide electrodes separate from the touch transmission ends, and to let these pin ends 114 function only as means for transmitting the touch or the tactile data.

As described above, the distribution type tactile sensor according to the present invention brings about the following effects or results.

(1) Now that the number of sensing points can be increased so as to correspond to the product of the number of electrode leads of groups of elecrodes of a polarity multiplied by the number of electrode leads of groups of electrodes of another polarity, it can becomes possible to simplify the arrangement of the tactile sensing control circuits, enhance the sensing speed, and realize a real time display of images requiring a number of tactile sensing points. Also, the number of required parts can be reduced, and the tactile sensor can be mounted on a surface of a sensor board with electrodes of a tactile sensing circuit.

(2) Now that it is possible to prevent otherwise likely stray currents, touch can be detected at a high accuracy.

(3) Now that the tactile sensor can be mounted on a sensor board with a tactile sensing circuit as above, the supporting of the sensor is facilitated, and it is possible to reduce the thickness of the sensor and to provide a sensor for a large load application.

(4) The tactile sensing circuit structure can be simplified as above, so that it is possible to make a sensor having unit sensors assembled in a two-dimensional arrangement and connected to one another with flexible electrode leads, whereby it is possible to provide a sensor for curved surfaces applicable to any optional curved surfaces.

(5) Although the size of a tactile sensing part is limited by the size of electrodes, an adapter is provided, which may be attached to the sensor to reduce the unit area required for tactile sensing.

(6) As a result of the above, it is now possible to apply the tactile sensor in a wide range of technical areas such as for studies on and/or for collections of data for designing in the field of human-factors engineering, for medical studies in the field of rehabilitation of handicapped people, and for industrial utility such as for or in robot's hands.

What is claimed is:

1. A distribution type tactile sensor comprising:
a plurality of electrodes provided in pairs at respective pressure sensing points on a pressure sensitive conductive rubber sheet capable of changing the electrical resistance responsive to compressive forces; and
rectifier means provided to respective electrodes for rectifying the current flowing across each pair of electrodes through the rubber sheet, the electrodes being divided into groups each comprising electrodes arranged in a line corresponding to respective polarities of the electrodes, wherein electrodes in respective electrode groups are parallel connected to one another through electrode leads, and directions of a division of electrode groups divided into respective polarities are crossed with one another at respective pressure sensing points;
wherein belts of the pressure sensitive conductive rubber sheet are disposed in a mutually parallel and spaced arrangement on pairs of electrodes provided on a sensor board in a chessboard arrangement, a cover having a relatively low friction resistance and comprising a flexible material is applied to the surfaces of the belts of the rubber sheet, and a flexible surface-forming member is further applied on the cover thereby providing a laminate structure; and wherein the peripheral edge of the laminate structure is fixed and electrodes having respective polarities are divided into respective groups in a mutually perpendicular arrangement.

2. The tactile sensor as claimed in claim 1, wherein each pair of electrodes is provided in a close arrangement to each other with a prescribed space therebetween, on one side surface of the pressure sensitive conductive rubber sheet.

3. The tactile sensor as claimed in claim 1, wherein each pair of electrodes is provided in a mutually facing arrangement, one on a front side surface and the other on a backside surface of the pressure sensitive conductive rubber sheet.

4. The tactile sensor as claimed in claim 1, 2 or 3, wherein a feed switch comprising switching elements is provided to respective electrode leads and to respective electrode groups of one polarity, while an output switch comprising switching elements is provided to respective electrode leads and to respective electrode groups of another polarity.

5. The tactile sensor as claimed in claim 1, 2 or 3 wherein a plurality of electrodes of one polarity which are provided in pairs through the pressure sensitive conductive rubber sheet and distributed in pairs, on the one hand, and a plurality of electrodes of another polarity which are provided in pairs through the rubber sheet and distributed in pairs, on the other hand, are respectively divided into groups in a mutually crossing arrangement, electrodes of a same group being connected to one another by an electrode lead, and wherein an imaging unit is provided for connecting a power source successively to the groups of electrodes of one polarity, taking a signal current successively from the groups of electrodes of another polarity and imaging the signal currents, and a display means is provided for displaying the data on the compression force acting at respective pressure sensing points, in the form of an image based on the result of the imaging.

6. The tactile sensor as claimed in claim 1, 2 or 3 wherein a plurality of unit sensors provided with electrodes arranged in pairs through the pressure sensitive conductive rubber sheet is provided in a two-dimensional arrangement, the electrodes of respective polarities being divided into mutually crossing respective groups, electrodes of a same polarity in a same group being connected to one another through an electrode lead, each adjacent unit sensors being connected to each other with a space therebetween, the space between adjacent unit sensors being variable.

7. The tactile sensor as claimed in claim 1, 2 or 3 which is provided with an adapter comprising pins having a concave and convex detecting end to be contacted against an object and an opposite touch transmission end, the detecting ends being arranged at prescribed positions, the touch transmission ends being arranged so as to transmit compression forces to points on the pressure sensitive conductive rubber sheet at which pairs of electrodes are provided, said adapter further comprising a pin holder.

8. The tactile sensor as claimed in claim 1, wherein an electronic member to be provided to respective electrodes and a wiring are provided on a backside of the sensor board, and under the electronic member and the wiring, a support member is provided, which comprises a composite material of a sandwich structure provided with a surface-forming member on each side surface.

* * * * *

UNITED STATES PATENT AND TRADEMARK OFFICE
CERTIFICATE OF CORRECTION

PATENT NO. : 5,010,774

DATED : April 30, 1991

INVENTOR(S) : KANAYA et al

It is certified that error appears in the above-identified patent and that said Letters Patent is hereby corrected as shown below:

On the cover page, item [19], "Kanaya Kikuo", should read --Kikuo Kanaya--.

Signed and Sealed this

Twenty-ninth Day of September, 1992

Attest:

DOUGLAS B. COMER

Attesting Officer     Acting Commissioner of Patents and Trademarks